United States Patent
Andrews et al.

(10) Patent No.: US 11,516,386 B2
(45) Date of Patent: Nov. 29, 2022

(54) SYSTEM AND METHOD FOR INTELLIGENT IMAGING SENSORY CLASSIFICATION

(71) Applicant: DELL PRODUCTS, LP, Round Rock, TX (US)

(72) Inventors: Maxwell Andrews, Novato, CA (US); Rocco Ancona, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/155,425

(22) Filed: Jan. 22, 2021

(65) Prior Publication Data

US 2022/0239830 A1 Jul. 28, 2022

(51) Int. Cl.
| | | |
|---|---|---|
| *H04N 5/232* | (2006.01) | |
| *G06K 9/62* | (2022.01) | |
| *H04N 5/225* | (2006.01) | |
| *G06V 10/75* | (2022.01) | |

(52) U.S. Cl.
CPC ......... *H04N 5/23225* (2013.01); *G06K 9/628* (2013.01); *G06V 10/751* (2022.01); *H04N 5/2252* (2013.01); *H04N 5/2257* (2013.01); *H04N 5/23222* (2013.01)

(58) Field of Classification Search
CPC ............. H04N 5/23225; H04N 5/2252; H04N 5/2257; H04N 5/23222; G06V 10/751; G06K 9/628
See application file for complete search history.

(56) References Cited

U.S. PATENT DOCUMENTS

| | | | |
|---|---|---|---|
| 8,340,498 B1* | 12/2012 | Gill | G11B 27/105 386/245 |
| 9,083,937 B1* | 7/2015 | Oliphant | H04N 9/79 |
| 10,015,546 B1* | 7/2018 | Petty | H04N 21/233 |
| 10,180,615 B2* | 1/2019 | Kilgore | G02B 5/208 |
| 10,909,373 B1* | 2/2021 | Gupta | G06T 7/586 |
| 10,997,423 B1* | 5/2021 | Borras | G06V 20/56 |
| 2008/0098017 A1* | 4/2008 | Joo | H04N 5/913 |
| 2008/0120240 A1* | 5/2008 | Ginter | G06Q 20/085 705/51 |
| 2009/0180025 A1* | 7/2009 | Dawson | H04N 21/4318 348/739 |
| 2014/0177905 A1* | 6/2014 | Grefalda | H04N 5/23212 382/103 |

(Continued)

OTHER PUBLICATIONS

Larsen, It took Dell years to fix 1 problem on its best laptop. Here's how it did it; Digital Trends, https://www.digitaltrends.com/users/llarsen; Jan. 22, 2019; 12 pages.

(Continued)

*Primary Examiner* — Amy R Hsu
(74) *Attorney, Agent, or Firm* — Larson Newman, LLP

(57) ABSTRACT

An intelligent image sensory system includes its own embedded or modular image processing capability. The intelligent image sensory system may capture, process, and content classify digital frames. Each digital frame may be classified as permissible or objectionable, according to trainable content rules and policies. The intelligent image sensory system conducts a real time, frame-by-frame content analysis to avoid sharing of personal/sensitive data. An audio input system may also be controlled, based on the content of each frame.

20 Claims, 14 Drawing Sheets

(56) References Cited

U.S. PATENT DOCUMENTS

| | | | |
|---|---|---|---|
| 2015/0070516 A1* | 3/2015 | Shoemake | H04N 21/4542 348/207.11 |
| 2015/0116471 A1* | 4/2015 | Chang | H04N 5/232945 348/77 |
| 2016/0082897 A1* | 3/2016 | Mouser | H04N 5/2257 348/148 |
| 2016/0328827 A1* | 11/2016 | Ilic | H04N 1/387 |
| 2017/0171498 A1* | 6/2017 | Ogi | H04N 5/2256 |
| 2019/0392724 A1* | 12/2019 | Breed | G09B 5/00 |
| 2021/0067699 A1* | 3/2021 | Huang | H04N 9/045 |
| 2021/0208479 A1* | 7/2021 | Clark | H04R 1/08 |

OTHER PUBLICATIONS

Qualcomm Snapdragon, https://www.qualcomm.com/praducts/snapdragon; Wikipedia, https://en.wikipedia.org/w/index.phptitle=Qualcomm_Snapdragon&oldid-999254699; Jan. 9, 2021; 15 pages.

Sony to Release World's First Intelligent Vision Sensors with AI Processing Functionality, https://www.sony.com/en_us/SCA/company-news/press-releases/sony-electronics/2020/, Sony Corporation; May 14, 2020; 5 pages.

Sony's CMOS Image Sensor for Automotive—ISX016, https://www.sony-semicon.co.jp/products/common/pdf/ISX016.pdf; Version 1.0a; Feb. 2016; 1 page.

* cited by examiner

SYSTEM AND METHOD FOR INTELLIGENT IMAGING SENSORY CLASSIFICATION

FIELD OF THE DISCLOSURE

This disclosure generally relates to information handling systems, and more particularly relates to intelligent classification of digital image frames as permissible or objectionable.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An intelligent image sensory system embeds its own image processing capability. The intelligent image sensory system integrates a CCD/CMOS image sensor with a dedicated image signal processor and a memory device. The image sensor, the image signal processor, and the memory device may be fabricated or embedded as a single chip. The image sensor, the image signal processor, and the memory device may alternatively be packaged as a single camera module. An audio input system may also be incorporated to either the chip or module, thus providing a microphone that detects audible speech for further processing capability. Regardless, the intelligent image sensory system is fully capable of capturing and processing digital frames of image data and/or video data. Each digital frame may be individually classified as permissible or objectionable, according to trainable content rules and policies. Moreover, because the intelligent image sensory system embeds dedicated processing and memory circuits, expanded artificial intelligence may analyze the content of each frame according to any AI model. The audio input system may also be controlled, based on the content of each frame. As the intelligent image sensory system locally and independently analyzes and classifies images/at frame capture, remote or cloud-based video processing is eliminated. Network bandwidth is greatly reduced, as packets of image/video data need not be conveyed to remote devices/servers for processing. Less electrical power is consumed, and communications costs are reduced, as compared to remote, cloud service processing. The risk of security compromise or breach of private data is minimized, as this private data need not be transmitted to a service over a remote network for content analysis, nor does it need to be provided to the host operating system, where it may be vulnerable to exposure to a malicious application or process.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
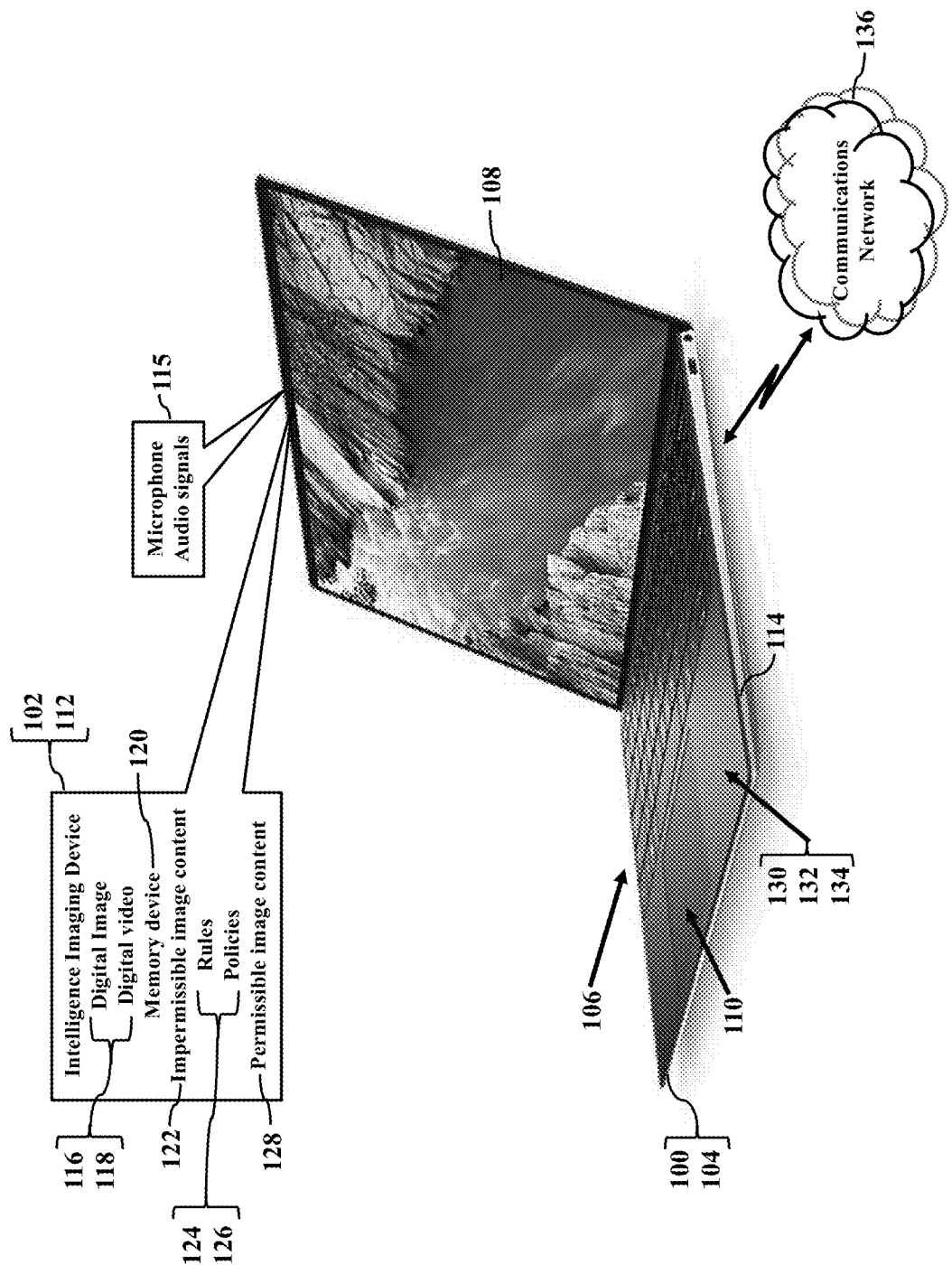
FIG. 1 illustrates an information handling system incorporating an intelligent imaging device, according to exemplary embodiments.

FIG. 1 illustrates an information handling system, such as a portable laptop computer 100, incorporating an intelligent imaging device 102 according to exemplary embodiments. The information handling system 100, however, may also be embodied as a smart cellular telephone, a desktop computer, a camera, or any other processor-controlled device. As a user types on a keyboard 106 and/or touches or navigates a touch screen display 108 and a touch panel 110, the intelligent imaging device 102 (or web camera 112) captures/generates digital images and videos ("selfies") of the user. FIG. 1 illustrates the intelligent imaging device 102 incorporated as an upper component of a bezel surrounding the touch screen display 108, but the intelligent imaging device 102 may be alternatively incorporated as a component into an outer enclosure or chassis 114. The intelligent imaging device 102 captures digital images 116 and video 118 of the user, while a microphone 115 also captures audio signals representing the user's speech. The user may thus conduct web conferences using the laptop computer 104.

There are times when video conferences must be conducted at inopportune moments, and so the web camera 112 and the microphone 115 may capture content regarded as inappropriate, embarrassing, or unprofessional. The digital images 116 and video 118 may thus contain depictions of unkempt hair, partial or inappropriate clothing, nudity, or objects or activities that may be inappropriate or embarrassing for audio and/or video transmission if relayed without the expressed intent of the user. Exemplary embodiments may thus self-govern video and audio capture based on detection of content meeting these criteria, or other criteria as defined by policy and preferences. As the intelligent imaging device 102 captures digital data such as the images 116 and video 118 of the user, the intelligent imaging device 102 may first internally quarantine the images 116 and video 118. The intelligent imaging device 102, in other words, stores and holds the images 116 and video 118 in its own dedicated, internal memory device 120 such as a frame buffer.

The intelligent imaging device 102 determines whether those images 116 and video 118 contain or represent impermissible image content 122. The intelligent imaging device 102, in other words, self-inspects the images 116 and video 118 and compares to logical rules 124 and/or management policies 126 that define permissible image content 128 and/or impermissible image content 122. If the images 116 and video 118 satisfy or pass any one or more of the logical rules 124 and/or the management policies 126, then the intelligent imaging device 102 classifies the images 116 and video 118 as the permissible image content 128. Because the images 116 and video 118 are permissible, the intelligent imaging device 102 releases the images 116 and video 118 from its dedicated, internal memory device 120 for further use by the laptop computer 104.

The intelligent imaging device 102 may thus send or communicate the images 116 and video 118, such as via a bus architecture (not shown for simplicity) to a separate central processing unit 130 executing a disk operating system 132. The images 116 and video 118 may thus be safely used by the laptop computer 104, and perhaps even uploaded via a network interface 134 to a communications network 136 such as the Internet.

Content, however, may be deemed prohibited. As the intelligent imaging device 102 compares the images 116 and video 118 to the logical rules 124 and/or the management policies 126, the images 116 and video 118 may contain the impermissible image content 122. The images 116 and video 118, for example, may contain inappropriate clothing, inappropriate or even illegal activities or objects, nudity, or simply an undesirable shirt or background. However the user, or an administrator, configures the logical rules 124 and/or the management policies 126 that define the impermissible image content 122, the intelligent imaging device 102 self-monitors the images 116 and video 118 for offending objects, portions, and/or pixels. Should the intelligent imaging device 102 determine the impermissible image content 122, the intelligent imaging device 102 may continue quarantining the impermissible images 116 and video 118 stored in its dedicated, internal memory device 120.

The intelligent imaging device 102 may even lock the offending images 116 and video 118 in quarantine, thus preventing the offending images 116 and video 118 from exiting the dedicated, internal memory device 120 and/or the intelligent imaging device 102. The intelligent imaging device 102 may prevent the impermissible images 116 and video 118 from being output, such as from the frame buffer to the separate central processing unit 130. The intelligent imaging device 102 may also delete, purge, and/or overwrite the offending images 116 and video 118 from its dedicated, internal memory device 120, again preventing usage by the separate central processing unit 130 and from an upload to the communications network 136 or the Internet. The intelligent imaging device 102 thus protects the user from an embarrassing release of sensitive data.

The intelligent imaging device 102 may filter portions of the offending images 116 and video 118 in quarantine, by over-writing the offending portions with non-offending or blank pixels, by over-writing the offending portions with modified transformations of the original pixels such as blurring or quantization, or by over-writing the offending portions with computer generated content such as provided by an image inpainting algorithm or digital character model. The intelligent imaging device 102 may re-analyze the modified image or video frame against logical rules 124 and/or the management policies 126 to ensure that the modified image is no longer classified as impermissible. Upon successful modification of the offending images 116 and video 118 in quarantine, the intelligent imaging device 102 may allow to modified images 116 and video 118 to proceed to a separate central processing unit 130 executing a disk operating system 132. In addition, the intelligent imaging device 102 may also provide a log of events to disk operating system 132 executing on separate central processing unit 130 describing what actions or modifications were taken automatically in reaction to images 116 or video 118. Disk operating system 132 may provide the user with a notification or prompt the user for further direct action if certain impermissible content was detected, and/or if the image or video was modified, according to logical rules 124 and/or the management policies 126.

Exemplary embodiments thus present an elegant solution. The intelligent imaging device 102 self-analyzes and classifies image/video data content. The logical rules 124 and/or the management policies 126 may be tuned, configured, and/or updated to reflect personal/corporate/business considerations for what constitutes the permissible image content 128 and the impermissible image content 122. Any data classified as the permissible image content 128 may be output and even uploaded into the Internet. Any data classified as the impermissible image content 122, however, may be quarantined, modified, and/or deleted. The intelligent imaging device 102 is thus locally self-governing to autonomously determine permissible and objectionable digital images and video.

Image and video processing consume great resources. In today's communications environment, people are sending countless digital photos and videos over networks. Video streaming services have only added to network congestion. Moreover, as more and more devices connect to the Internet, more and more packets of data are being sent across clouds of networks. Communications latency has thus greatly increased, and cloud-based artificial intelligence services will only increase latency. Real-time information processing is thus hindered, more electrical power is consumed by the cloud, and network costs are increasing. Keeping latency at a minimum is paramount to effective remote communication, as excessive delays between participants can result in confusion, interruptions, and degradation of the effectiveness and natural flow of real-time conversations.

Figure 2:
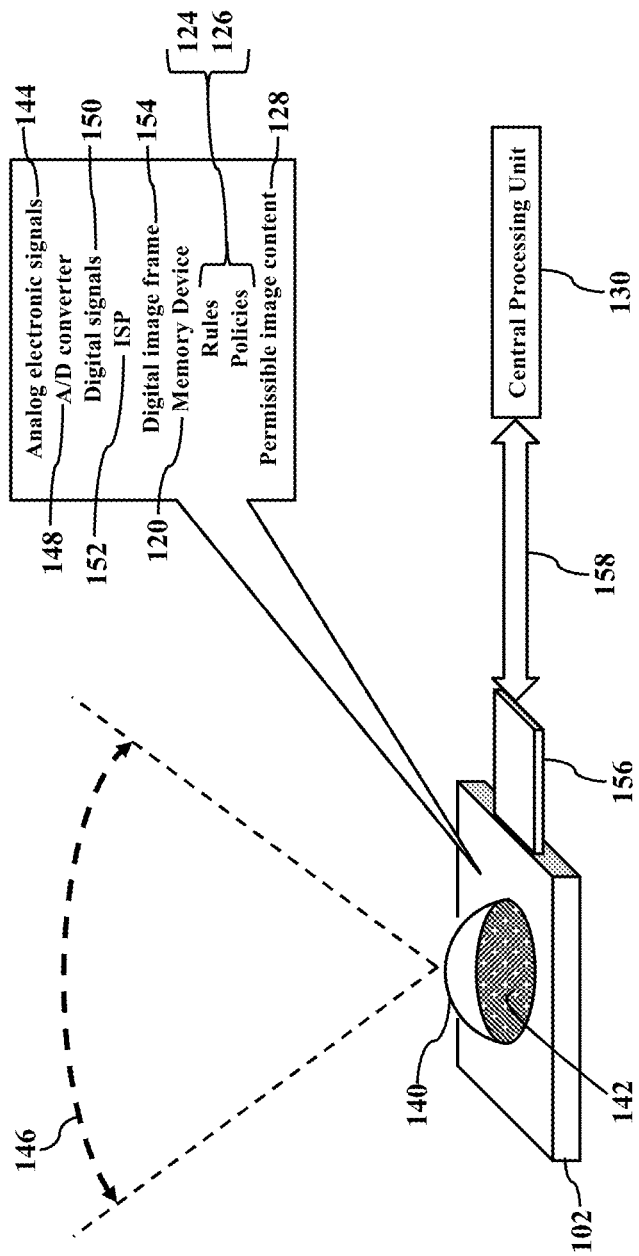
FIG. 2 further illustrates the intelligent imaging device, according to exemplary embodiments.

FIG. 2 further illustrates the intelligent imaging device 102, according to exemplary embodiments. Because the intelligent imaging device 102 is very small, generally less than five mm in diagonal width, FIG. 2 is enlarged for clarity. The intelligent imaging device 102 may be packaged with one or more optical lenses 140 that focus electromagnetic waves such as visible and/or infrared frequencies or "light", into or onto an image sensor 142. The image sensor 142 may generate analog electronic signals 144, representing a reference subject, captured within a field 146 of view of the image sensor 142 and the lens 140.

The intelligent imaging device 102 may have an internal, integrated analog-to-digital converter 148 that converts the electronic signals 144 into digital signals 150. An internal, integrated image sensor processor 152 receives the digital signals 150 and processes the digital signals 150 as a single, digital image frame 154. The image sensor processor 152 processes, stores, and quarantines the frame 154 in the internal, integrated memory device 120. If the frame 154 is classified as the permissible image content 128 (based on the rules 124 and/or management policies 126), the image sensor processor 152 releases the frame 154 from quarantine.

The frame 154 may then be output via a ribbon cable 156 and external bus architecture 158 to the separate central processing unit 130. Should the frame 154 be classified as the impermissible image content 122, the frame 154 may remain quarantined and/or deleted without outputting to the external bus architecture 158. The impermissible image content 122 may thus not exit or nor escape the on-chip, integrated memory device 120. When the intelligent imaging device 102 receives electrical power, such as conveyed along conductors in the ribbon cable 156, from an electrical power rail, connection, or power supply, the intelligent imaging device 102 locally self-governs its operation and autonomously determines permissible and objectionable digital images and video.

Figure 3:
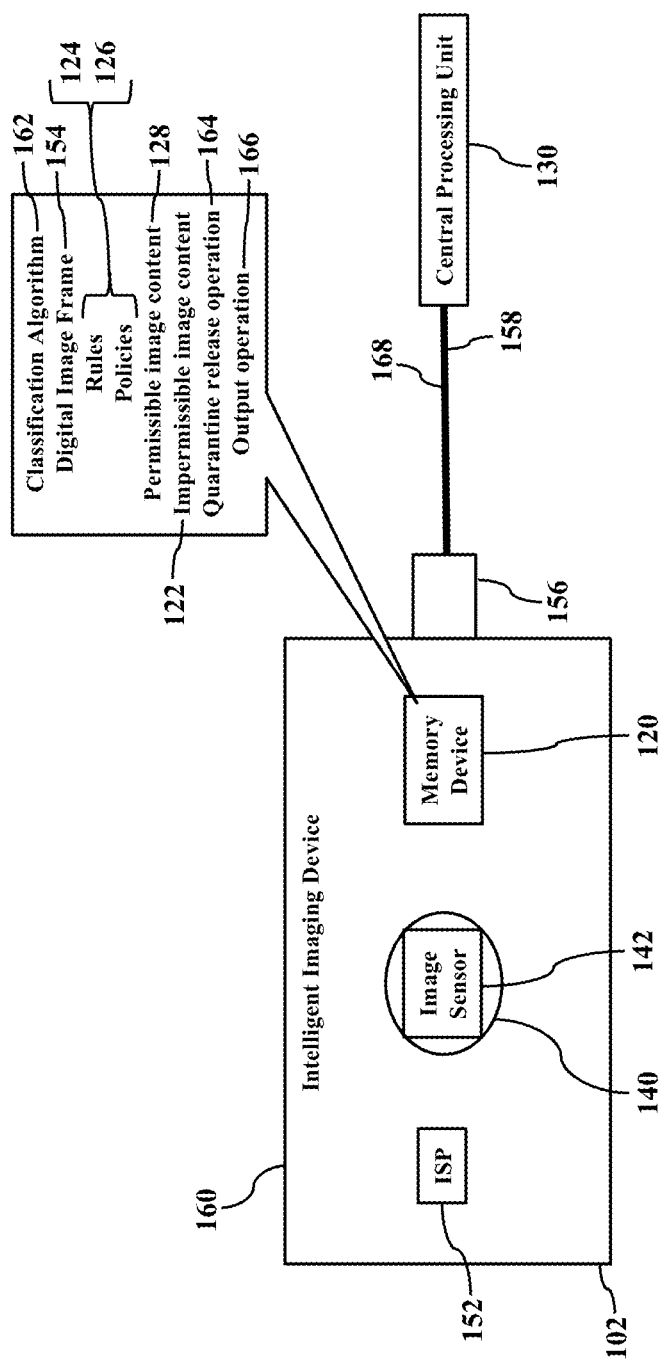
FIGS. 3-4 illustrate more detailed block diagrams of the intelligent imaging device, according to exemplary embodiments.
Figure 4:
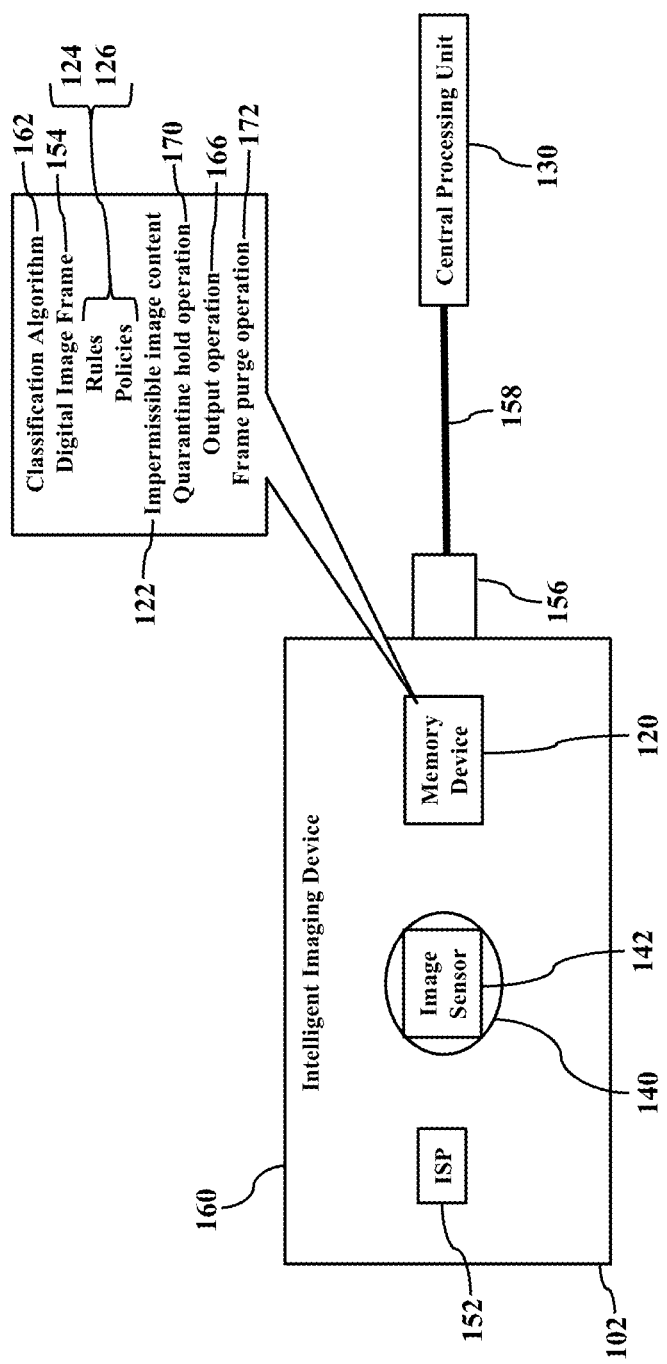

FIGS. 3-4 illustrate a more detailed block diagram of the intelligent imaging device 102, according to exemplary embodiments. The intelligent imaging device 102 integrates the image sensor 142 with the dedicated, integrated image signal processor 152 and the dedicated, internal memory device 120 fabricated as electrical circuits on a single semiconductor chip 160. The lens 140 may then be subsequently added as a separate component that overlays onto or over the image sensor 142. The lens 140 has optical features or qualities that focus ambient waves/light onto the image sensor 142.

The intelligent imaging device 102 is self-governing. The intelligent imaging device 102 generates and stores the first, single frame 154. Prior to generating a subsequent, second frame, the intelligent imaging device 102 inspects the frame 154 for inappropriate or impermissible objects, portions, and/or pixels, according to the rules 124 and/or management policies 126 specifying the permissible image content 128 and/or the impermissible image content 122. The image signal processor 152 executes a classification algorithm 162 that is also locally stored in the on-chip memory device 120.

The classification algorithm 162 comprises logical instructions or code that cause the image signal processor 152 to perform operations, such as processing the frame 154 and comparing the frame 154 to the logical rules 124 and/or the management policies 126. If the frame 154 satisfies or passes any one or more of the logical rules 124 and/or management policies 126 defining the permissible image content 128, then the integrated image signal processor 152 may approve or execute a quarantine release operation 164 that releases the frame 154 from the local, dedicated, integrated memory device 120.

The integrated image signal processor 152 may additionally or alternatively authorize an output operation 166 that outputs the digital image frame 154 as an output signal 168 from the intelligent imaging device 102. The integrated image signal processor 152 may thus output the permissible image content 128, via the ribbon cable 156, to the external bus architecture 158 and to the separate central processing unit 130. After the frame 154 is output, the integrated image signal processor 152 authorizes, approves, and/or receives subsequent signals from the image sensor 142 and generates a subsequent, second frame for classification.

As FIG. 4 illustrates, however, the content may be prohibited. As the integrated image signal processor 152 compares the frame 154 to the logical rules 124 and/or the management policies 126, the frame 154 may contain or represent the impermissible image content 122. The frame 154, in other words, contains or represents objects, portions, and/or pixels that fail a comparison to the permissible image content 128 and/or that match or satisfy the impermissible image content 122. Because at least some portion of the frame 154 may be prohibited, the integrated image signal processor 152 may authorize or execute a quarantine hold operation 170 that holds or confines the digital image frame 154 to or within the local, dedicated, integrated memory device 120.

The digital image frame 154 is locked within, and prevented from exiting, the intelligent imaging device 102. The quarantine hold operation 170 thus prevents the integrated image signal processor 152 from authorizing or executing the output operation 166, so the digital image frame 154 is prevented from being output as the output signal 168 (illustrated in FIG. 4). The intelligent imaging device 102 may further authorize or execute a frame purge operation 172 that deletes, erases, clears, and/or purges the digital image frame 154 from the local, dedicated, integrated memory device 120.

After the frame 154 is deleted/overwritten, the integrated image signal processor 152 authorizes, approves, and/or receives subsequent signals from the image sensor 142 and generates a subsequent frame for another classification. The intelligent imaging device 102 thus governs or manages itself and prevents external, inter-communication or passing of the impermissible digital image frame 154 via the external bus architecture 158 to the external central processing unit 130.

Figure 5:
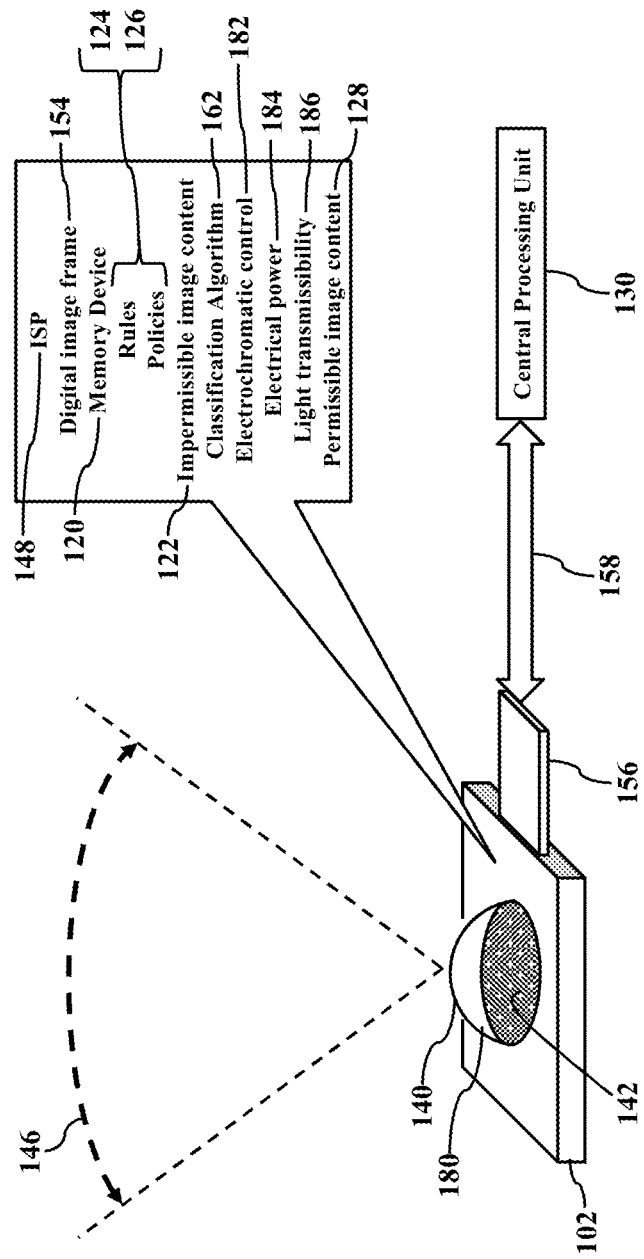
FIG. 5 illustrates electronic lens control, according to exemplary embodiments.

FIG. 5 illustrates electronic lens control, according to exemplary embodiments. The lens 140 may have an electrochromic property 180 that may be controlled, or selectively activated or deactivated, based on the content classification of the digital image frame 154. When the integrated image signal processor 152 compares the frame 154 to the logical rules 124 and/or the management policies 126 and determines the impermissible image content 122, the classification algorithm 162 may cause or instruct the integrated image signal processor 152 to implement an electrochromatic control 182 of the lens 140.

For example, in response to the impermissible image content 122, the classification algorithm 162 may cause or instruct the integrated image signal processor 152 to authorize, approve, or even apply an electric power 184 such as voltage and/or current to electrodes, pins, or connections to the lens 140. The electric power 184 activates the electrochromic property 180, causing the lens 140 to alter or change its light transmissibility 186. So, should the single frame 154 be classified as the impermissible image content 122, the integrated image signal processor 152 may authorize or command the electric power 184 be sent or applied to the lens 140 to effectively darken or reduce its light transmissibility 186.

A low light transmissibility 186 reduces or even prevents electromagnetic waves/photons from passing through the lens 140 to the image sensor 142, and no subsequent frame is generated. The image signal processor 152 effectively turns off the ability of the lens 140 to direct visible/infrared light to the image sensor 142, so any subsequent image frames are effectively illegible, nearly all-black, or null in value. The image signal processor 152 may additionally or alternatively stop, prohibit, or disconnect the electrical power 184 to the image sensor 142, thus further stopping image/frame capture and generation. The integrated image signal processor 152 thus polices itself to prevent a dissemination of sensitive image data.

The lens 140 may commanded in response to permissible images. Should the single frame 154 be classified as the permissible image content 128, the integrated image signal processor 152 reduces or removes the electric power 184 from the lens 140 to lighten or increase its light transmissibility 186. Increased light transmissibility 186 allows electromagnetic waves/photons to pass through the lens 140 to the image sensor 142, and the image sensor 142 generates subsequent signals that are processed as a subsequent digital image frame for classification. The intelligent imaging device 102 may thus electrochromatically control the lens 140 in response to frame-by-frame content.

Figure 6:
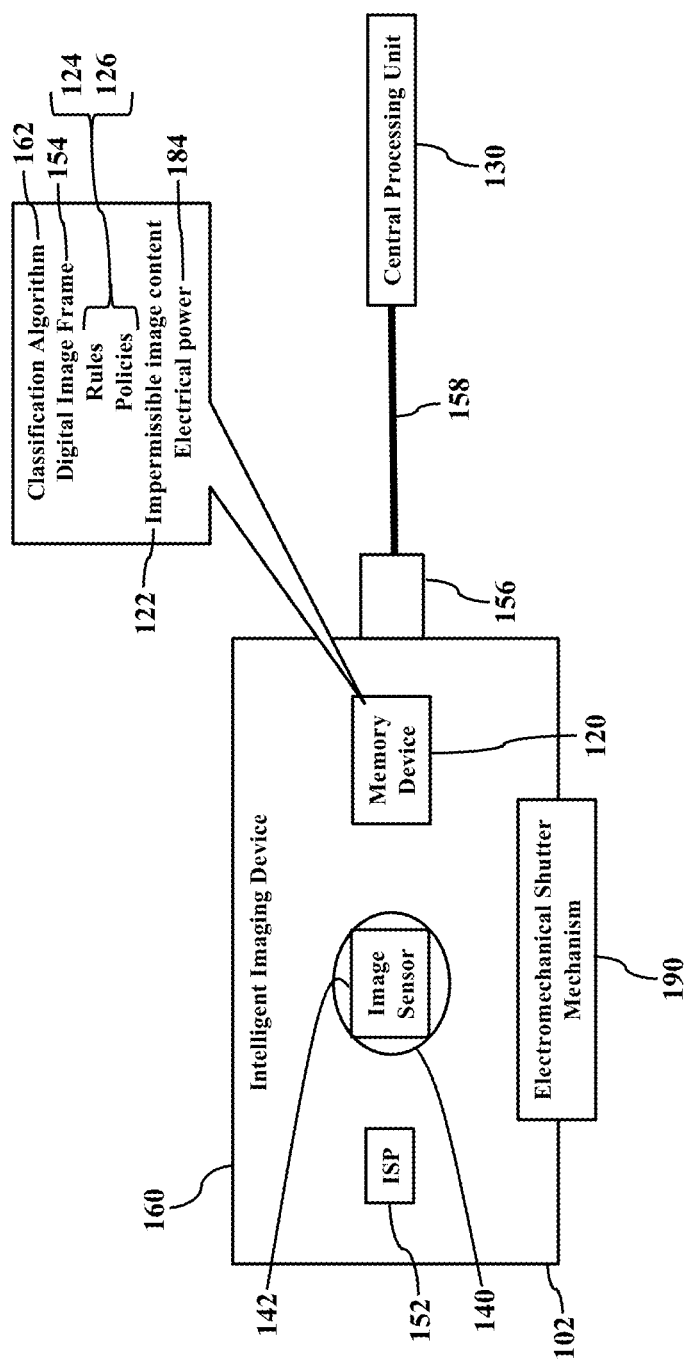
FIG. 6 illustrates shutter control, according to exemplary embodiments.

FIG. 6 illustrates shutter control, according to exemplary embodiments. The intelligent imaging device 102 may be packaged to additionally or alternatively incorporate an electromechanical shutter mechanism 190. The electromechanical shutter mechanism 190 may interface with, be electrically connected to, and be commanded by the integrated image signal processor 152. The electromechanical shutter mechanism 190 may have micro/nano-mechanical louvers, shutters, or panels (not shown for simplicity) that open and close in response to the electrical power 184 and to commands from the integrated image signal processor 152. Should the integrated image signal processor 152 classify the frame 154 as the impermissible image content 122, the classification algorithm 162 may cause or instruct the integrated image signal processor 152 to send a close command to the electromechanical shutter mechanism 190.

When the electromechanical shutter mechanism 190 receives the close command, the electromechanical shutter mechanism 190 activates and closes the micro/nano-mechanical louvers, shutters, or panels. This closing operation effectively prevents electromagnetic waves/photons from striking or passing to the image sensor 142, so no subsequent frame is generated. The image signal processor 152 effectively turns off the ability of the image sensor 142 to produce outputs representing visible light/images, so any subsequent image frames are effectively illegible, nearly all-black, or null in value. The integrated image signal processor 152 thus polices itself to prevent a dissemination of sensitive image data.

The electromechanical shutter mechanism 190 may be commanded in response to permissible images. Should the single frame 154 be classified as the permissible image content 128, the integrated image signal processor 152 may send an open command to the electromechanical shutter mechanism 190. When the electromechanical shutter mechanism 190 receives the open command, the electromechanical shutter mechanism 190 activates and opens the micro/nano-mechanical louvers, shutters, or panels. This opening operation effectively allows electromagnetic waves/photons to strike or pass to the image sensor 142, so a subsequent frame is generated for classification. The intelligent imaging device 102 may thus control the electromechanical shutter mechanism 190 in response to frame-by-frame content.

Figure 7:
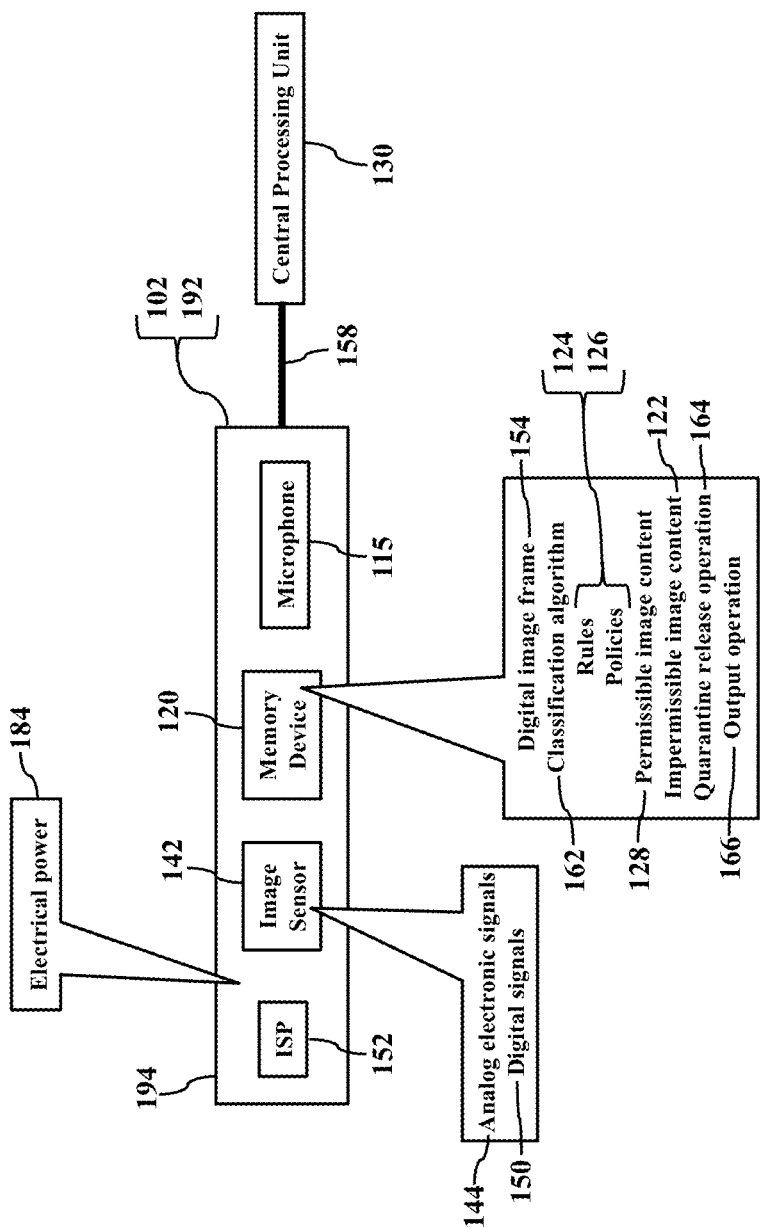
FIGS. 7-9 illustrate a modular architecture, according to exemplary embodiments.
Figure 8:
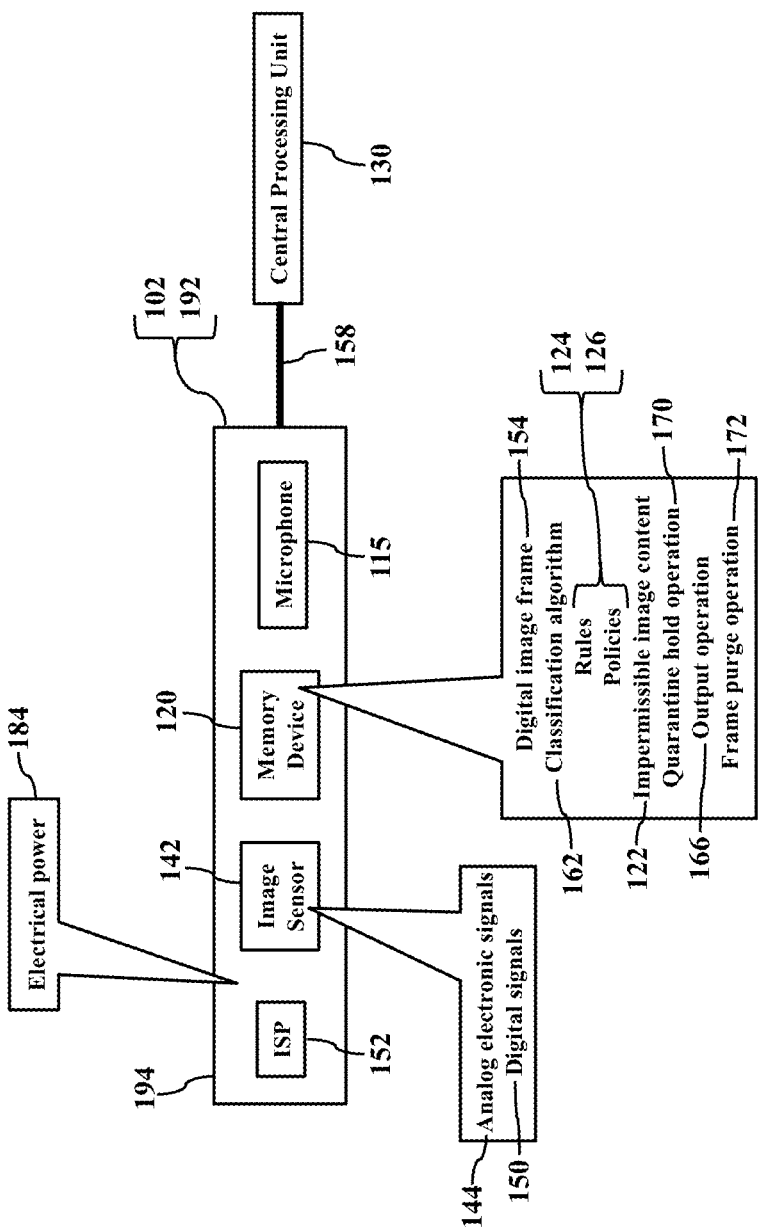
Figure 9:
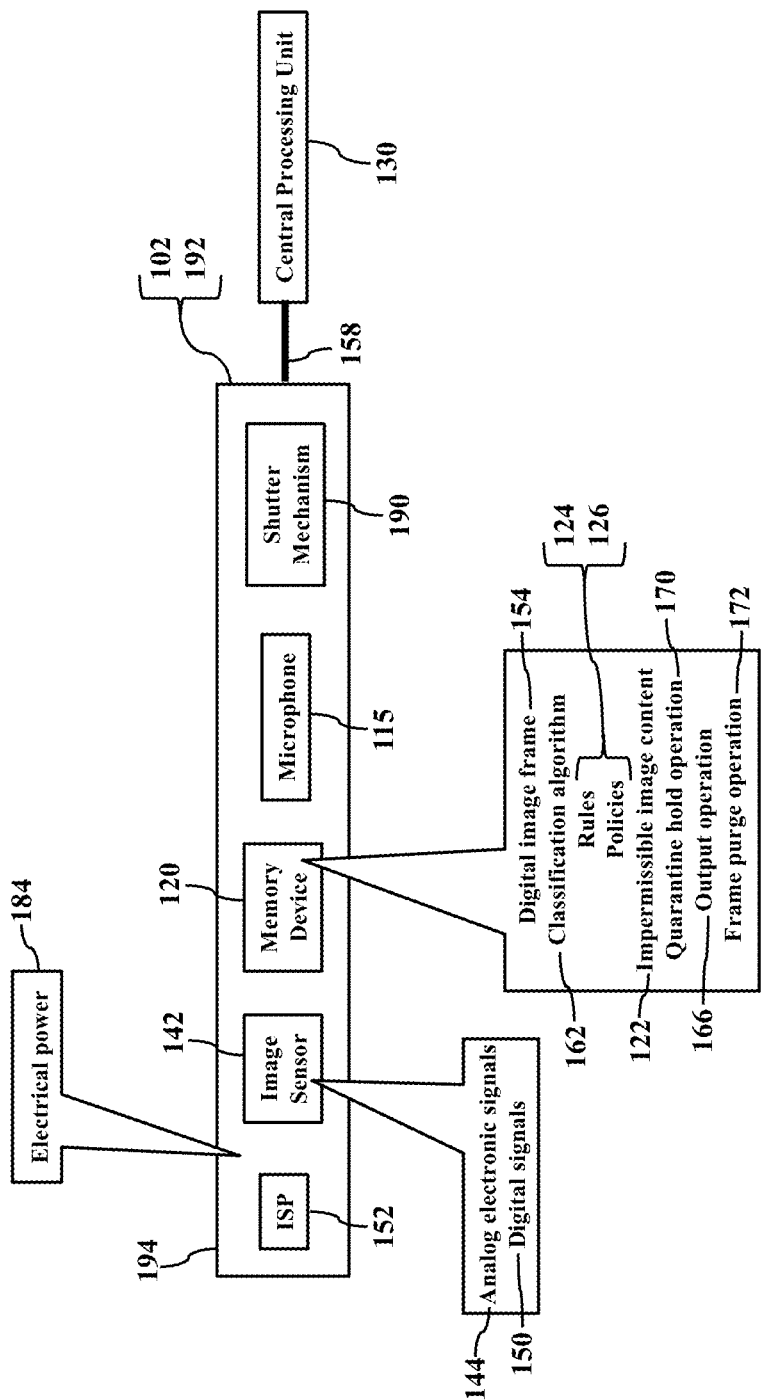

FIGS. 7-9 illustrate a modular architecture, according to exemplary embodiments. Here the intelligent imaging device 102 incorporates the image sensor 142, the image signal processor 152, the memory device 120, and perhaps the microphone 115 as separate components that are electrically connected together via a strip or ribbon of a printed circuit board 192. The image sensor 142, the image signal processor 152, the memory device 120, and perhaps the microphone 115 are packaged as a single module 194. When the printed circuit board 192 is installed in the laptop computer 100 (illustrated in FIG. 1), the printed circuit board 192 is electrically connected to the external bus architecture 158 and thus to the host laptop's central processing unit 130.

The module 194 self-classifies. When the electrical power 184 is provided or connected to the intelligent imaging device 102, the image sensor 142 generates the analog electronic signals 144 and converts the analog electronic signals 144 to the digital signals 150. Because the printed circuit board 192 electrically connects the image sensor 142 to the image signal processor 152, the image sensor 142 outputs the digital signals 150 which are received by the image signal processor 152. The printed circuit board 192 also electrically connects the image signal processor 152 to the memory device 120. The image signal processor 152 may thus process the digital signals 150 to generate the digital image frame 154, and the image signal processor 152 stores and quarantines the digital image frame 154 to the memory device 120. The printed circuit board 192 may also electrically connect the image signal processor 152 to the to the microphone 115.

The image signal processor 152 classifies the digital image frame 154. When the image signal processor 152 receives the digital image frame 154, the image signal processor 152 stores and quarantines the digital image frame 154 to the memory device 120. The image signal processor 152 inspects the frame 154 for inappropriate or impermissible objects, portions, and/or pixels, according to the rules 124 and/or management policies 126 specifying the permissible image content 128 and/or the impermissible image content 122. The image signal processor 152 executes the classification algorithm 162 that is stored in the memory device 120. The classification algorithm 162 comprises logical instructions or code that cause the image signal processor 152 to perform operations, such as processing the frame 154 and comparing the frame 154 to the logical rules 124 and/or the management policies 126. If the frame 154 satisfies or passes any one or more of the logical rules 124 and/or management policies 126 defining the permissible image content 128, then the image signal processor 152 may approve or execute the quarantine release operation 164 that releases the frame 154 from the memory device 120. The image signal processor 152 may additionally or alternatively authorize the output operation 166 that outputs the digital image frame 154 to the external bus architecture 158 and thus to the host laptop's central processing unit 130.

As FIG. 8 illustrates, however, the content may be prohibited. As the image signal processor 152 compares the frame 154 to the logical rules 124 and/or the management policies 126, the frame 154 may contain or represent the impermissible image content 122. The frame 154, in other words, contains or represents objects, portions, and/or pixels that fail a comparison to the permissible image content 128 and/or that match or satisfy the impermissible image content 122. Because at least some portion of the frame 154 may be prohibited, the image signal processor 152 may authorize or execute the quarantine hold operation 170 that holds or confines the digital image frame 154 to or within the memory device 120. The digital image frame 154 is locked within, and prevented from exiting, the memory device 120, the printed circuit board 192, and/or the single module 194.

The quarantine hold operation 170 thus prevents the image signal processor 152 from authorizing or executing the output operation 166, so the digital image frame 154 is prevented from being output to the external bus architecture 158 and to the host's central processing unit 130. The image signal processor 152 may further authorize or execute the frame purge operation 172 that deletes, erases, clears, overwrites, and/or purges the digital image frame 154 from the memory device 120. The module 194 thus governs or manages itself and prevents external, inter-communication or passing of the impermissible digital image frame 154 via the external bus architecture 158 to the host's external central processing unit 130. The offending frame 154 thus cannot be sent or uploaded to friends, coworkers, or the Internet.

Exemplary embodiments may also deactivate the microphone 115. When the image signal processor 152 classifies the frame 154 as the impermissible image content 122 (based on the logical rules 124 and/or the management policies 126), the module 194 may mute the microphone 115. Because the printed circuit board 192 electrically interconnects the image signal processor 152 to the to the microphone 115, the image signal processor 152 may command the microphone 115 to operate in response to the classification of the digital image frame 154. The microphone 115 may turn on or off in response to commands from, or the electrical power 184 supplied by, the integrated image signal processor 152. Should the image signal processor 152 classify the frame 154 as the impermissible image content 122, the classification algorithm 162 may cause or instruct the image signal processor 152 to send an off/mute command to the microphone 115. When the microphone 115 receives the off/mute command, the microphone 115 stops generating audio output signals, so no audio is captured/generated of sensitive or embarrassing moments. The image signal processor 152 effectively deactivates or turns off the microphone 115.

The microphone 115 may be commanded in response to permissible images. Should the single frame 154 be classified as the permissible image content 128, the image signal processor 152 may send an on/unmute command to the microphone 115. When the microphone 115 receives the on/unmute command, the microphone 115 activates and generates audio output signals. The image signal processor 152 receives the audio output signals and sends the audio output signals via the external bus architecture 158 to the host's external central processing unit 130. The module 194 may thus control the microphone 115 in response to frame-by-frame content.

As FIG. 9 illustrates, the module 194 may further include the electromechanical shutter mechanism 190. The printed circuit board 192 may further electrically connect the image signal processor 152 to the electromechanical shutter mechanism 190. The image signal processor 152 may thus send open and close commands to the electromechanical shutter mechanism 190, in response to frame-by-frame content. Should the image signal processor 152 classify the frame 154 as the impermissible image content 122, the classification algorithm 162 may cause or instruct the image signal processor 152 to close the micro/nano-mechanical louvers, shutters, or panels, thus preventing waves/photons from striking or passing to the image sensor 142 (as this disclosure above explained). Should the single frame 154 be classified as the permissible image content 128, the image signal processor 152 may open the micro/nano-mechanical louvers, shutters, or panels, thus allowing electromagnetic waves/photons to strike or pass to the image sensor 142. The module 194 thus polices itself to prevent a dissemination of sensitive image data.

The module 194 may additionally or alternatively include electrochromic control. Should the image sensor 142 incorporate the lens 140 having the electrochromic property 180 (as explained with reference to FIG. 5), the module 194 may darken and lighten the lens 140 in response to frame-by-frame content. When the image signal processor 152 compares the frame 154 to the logical rules 124 and/or the management policies 126 and determines the impermissible image content 122, the classification algorithm 162 may cause or instruct the image signal processor 152 to implement the electrochromatic control 182 of the lens 140. The image signal processor 152 may authorize, approve, or even apply the electric power 184 such as voltage and/or current to electrodes, pins, or connections to the lens 140. The lens 140 darkens to reduce its light transmissibility 186 and to reduce or even prevent electromagnetic waves/photons from passing through the lens 140 to the image sensor 142. However, should the frame 154 be classified as permissible, the image signal processor 152 reduces or removes the electric power 184 to increase the lens's light transmissibility 186. The image sensor 142 thus generates signals that are processed as a subsequent digital image frame for classification. The module 194 may thus electrochromatically control the lens 140 in response to frame-by-frame content.

The image sensor 142 likely has millions or billons of pixels. The image sensor 142 is a front or back illuminated solid-state device, and the CCD/CMOS pixels are arranged as a grid. When the electrical power 184 (voltage and/or current) is provided to a pixel, the pixel receives an incident electromagnetic wave or photon and photoelectrically converts the incident wave/photon to one of the analog signals 144. The image sensor 142 may also convert the analog signal 144 to one of the digital signals 150 for processing and classification by the image signal processor 152.

The image signal processor 152 may thus approve or deny subsequent frames 154 and audio output, based on the classification of a current frame 154. Once the current frame 154 is output, offloaded, or quarantined/deleted, the image signal processor 152 may retrieve and inspect a subsequent frame 154. Exemplary embodiments may thus block any objectionable frame 154 from being shared or communicated, while permissible frames 154 may be offloaded and/or uploaded to the communications network 136.

Exemplary embodiments may thus completely process and classify content within a time of generating/storing the single frame 154, prior to a subsequent frame being approved for generation and analysis. The image sensor 142 may thus be instructed, commanded, or electrically powered to only generate output signals one analog or digital frame at a time, and the image sensor 142 awaits a classification of the current frame 154 before generating output signals representing a subsequent frame. Exemplary embodiments may thus generate and classify each frame 154 within one single photoelectric capture or operation.

Exemplary embodiments may thus classify the single frame 154 in real-time, prior to the image sensor 142 generating a next, subsequent frame.

Exemplary embodiments may include greater artificial intelligence. Even though exemplary embodiments may perform image content analysis, exemplary embodiments may store and execute additional algorithms, rules, and policies for additional functionalities and uses. For example, facial recognition algorithms may be incorporated for user-specific functions. Intrusion and security features may be incorporated with facial recognition. Real-time image-based object tracking and responsive commands/actions may be incorporated. Even more elegant, different AI models may be written and rewritten to the memory device 120. Users can write AI models of their choice to the memory device 120.

Exemplary embodiments may output any video/image format. Because exemplary embodiments include their own image processing and memory capability, exemplary embodiments may output different image or video formats. The single frame 154 may be selectively output as high-resolution video/image data, YUV/RGB data, or ROI image data. Moreover, because exemplary embodiments may incorporate AI capability, content within the single frame 154 may be classified, recognized, and textually labeled with descriptive metadata (e.g., "car," "convertible top," "driver," "passenger," and facial names). The descriptive metadata is far, far smaller in data bytes than video/image data and requires far less packets of data to convey over a network. Moreover, the descriptive metadata lacks personally-identifying names and numbers, so privacy is enhanced. No actual image data need be outputted. Exemplary embodiments thus describe a smart, self-contained image/video/vision analytics machine. No additional hardware is required to process and to classify image data.

Figure 10:
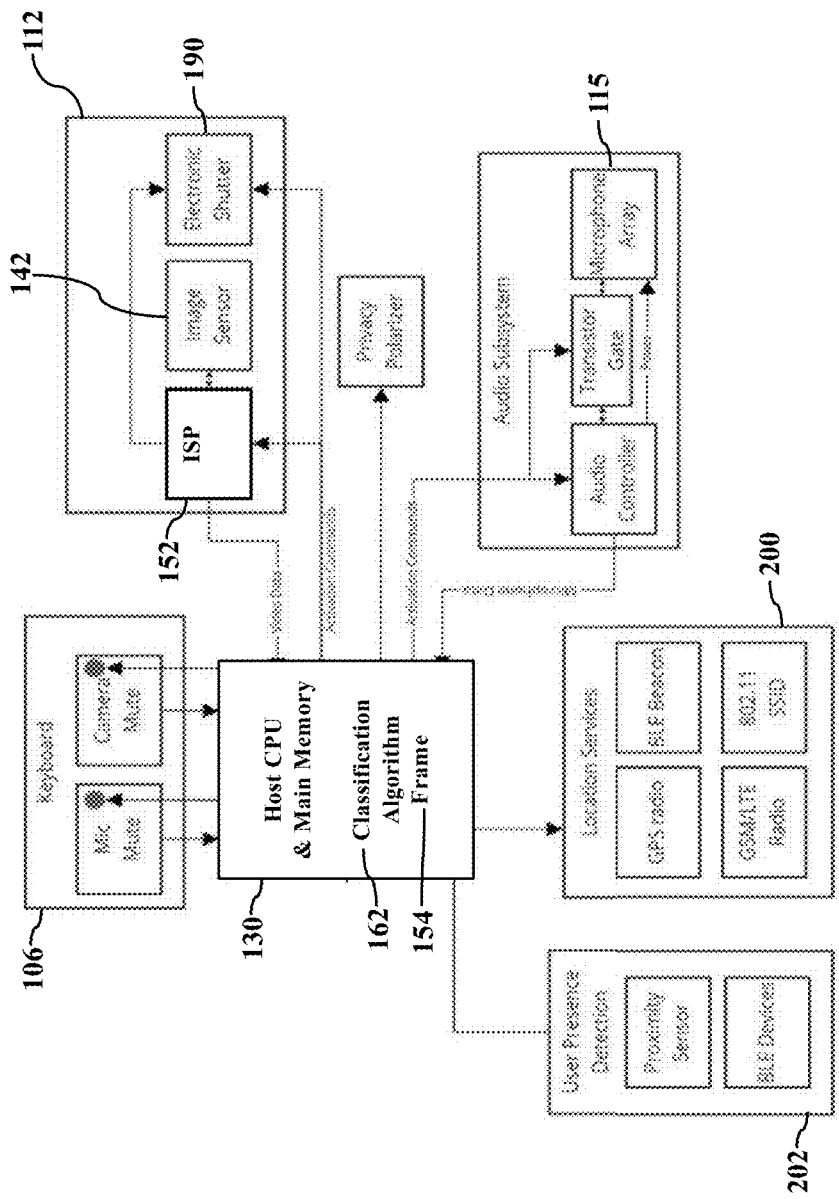
FIG. 10 is a block diagram illustrating a chassis-based system classification, according to exemplary embodiments.

FIG. 10 shows a chassis-based system classification, according to exemplary embodiments. Here the information handling system 100 (such as the laptop computer 104 illustrated in FIG. 1) uses its host central processing unit 130 and main memory to classify outputs from the web camera 112. The web camera 112 includes its internal image sensor 142, the image signal processor 152, the memory device 120, and perhaps the electromechanical shutter mechanism 190. The web camera 112 thus generates the digital image frame 154, as this disclosure above explains. Here the web camera 112 offloads or sends the digital image frame 154, such as via the bus 158, to the host's central processing unit 130 for image classification.

The host performs classification. The host's main memory stores the classification algorithm 162 (plus perhaps the logical rules 124 and/or the management policies 126 logically defining or specifying the impermissible image content 122 and/or the permissible image content 128, which are not shown for simplicity). The host's main memory also stores and quarantines the digital image frame 154, such as may be sent via the bus 158, from the image signal processor 152 operating in the web camera 112. The host's central processing unit 130 executes the classification algorithm 162 to perform operations, such as classifying the digital image frame 154 according to the logical rules 124 and/or the management policies 126.

The host's central processing unit 130 may then control and command the web camera 112 and any audio system (such as the microphone 115), according to the classification of the digital image frame 154. When the host's central processing unit 130 inspects frame 154 and determines the permissible image content 128, the host's central processing unit 130 may approve or execute the quarantine release operation 164 that releases the frame 154 from the main memory. The host's central processing unit 130 may additionally or alternatively authorize the output operation 166 that outputs the digital image frame 154, such as via the bus 158, to a network interface for upload into the Internet.

However, if the frame 154 is classified as the impermissible image content 122, the host's central processing unit 130 may authorize or execute the quarantine hold operation 170 that holds or confines the digital image frame 154 to or within the main memory. The host's central processing unit 130 locks and prevents the digital image frame 154 from permissible to exit the main memory. The host's central processing unit 130 may thus lack an ability, configuration, or permission to issue a read operation to the main memory to read/retrieve the frame 154. Neither may the host's central processing unit 130 nor the main memory send or address the frame 154 along the bus 158 to the network interface.

The offending frame 154 is locked within, and prevented from exiting, the host's main memory. Indeed, the classification algorithm 162 may only permit the host's central processing unit 130 to issue a write operation to the main memory to overwrite the frame 154 with different (null) data or perhaps fresh data, such as a subsequent frame generated by the web camera 112. The offending frame 154 thus cannot be sent or uploaded to friends, coworkers, or the Internet.

Exemplary embodiments may also deactivate the microphone 115. When the host's central processing unit 130 classifies the frame 154 as the impermissible image content 122 (based on the logical rules 124 and/or the management policies 126), the host's central processing unit 130 may mute the microphone 115. The host's central processing unit 130 may command the microphone 115 to operate in response to the classification of the digital image frame 154. The microphone 115 may turn on or off in response to commands from, or the electrical power 184 supplied by, the host's central processing unit 130. Should the host's central processing unit 130 classify the frame 154 as the impermissible image content 122, the classification algorithm 162 may cause or instruct the host's central processing unit 130 to send an off/mute command to the microphone 115. When the microphone 115 receives the off/mute command, the microphone 115 stops generating audio output signals, so no audio is captured/generated of sensitive or embarrassing moments. The host's central processing unit 130 effectively deactivates or turns off the microphone 115 in response to image content classification.

The microphone 115 may be commanded in response to permissible images. Should the single frame 154 be classified as the permissible image content 128, the host's central processing unit 130 may send an on/unmute command to the microphone 115. When the microphone 115 receives the on/unmute command, the microphone 115 activates and generates audio output signals. The host's central processing unit 130 receives and processes the audio output signals to the network interface for upload into the Internet. The host's central processing unit 130 may thus control the microphone 115 in response to frame-by-frame content.

The host's central processing unit 130 may further control the electromechanical shutter mechanism 190. The host's central processing unit 130 may send open and close commands to the electromechanical shutter mechanism 190 operating in the web camera 112, in response to frame-by-frame content. Should the host's central processing unit 130 classify the frame 154 as the impermissible image content 122, the classification algorithm 162 may cause or instruct the host's central processing unit 130 to command the web camera 112 to close the micro/nano-mechanical louvers, shutters, or panels, thus preventing waves/photons from striking or passing to the image sensor 142. Should the single frame 154 be classified as the permissible image content 128, the host's central processing unit 130 may command the web camera 112 to open the micro/nanomechanical louvers, shutters, or panels, thus allowing electromagnetic waves/photons to strike or pass to the image sensor 142. The host's central processing unit 130 thus polices itself and the web camera 112 to prevent a dissemination of sensitive image data.

The host's central processing unit 130 may additionally or alternatively include electrochromic control. Should the image sensor 142 incorporate the lens 140 having the electrochromic property 180, as explained above, the host's central processing unit 130 may darken and lighten the lens 140 in response to frame-by-frame content. The host's central processing unit 130 sends a darken command to the web camera 112 in response to the impermissible image content 122, and the darken command instructs the web camera 112 to darken the electrochromic lens 142 to reduce or even prevent electromagnetic waves/photons from passing through the lens 140 to the image sensor 142. However, should the frame 154 be classified as permissible, the host's central processing unit 130 sends a lighten command to increase the lens's light transmissibility 186. The host's central processing unit 130 may thus electrochromatically control the web camera 112 in response to frame-by-frame content.

Other features and components may also be controlled. The host's central processing unit 130, for example, may interface with various locational services 200. These locational services 200 use electromagnetic signals, such as GPS, cellular, and Bluetooth, to determine a current location. The host's central processing unit 130 may enable and disable any transceivers in response to frame-by-frame content. The host's central processing unit 130 may also interface and control presence detection systems 202, based on frame-by-frame content classifications. These presence detection systems 202 may use pressure, capacitance, infrared, and vision to detect a presence of the user, such as using the information handling system 100. The host's central processing unit 130 may also enable and disable any Bluetooth Low Energy (BLE) device, based on frame-by-frame content classifications.

Figure 11:
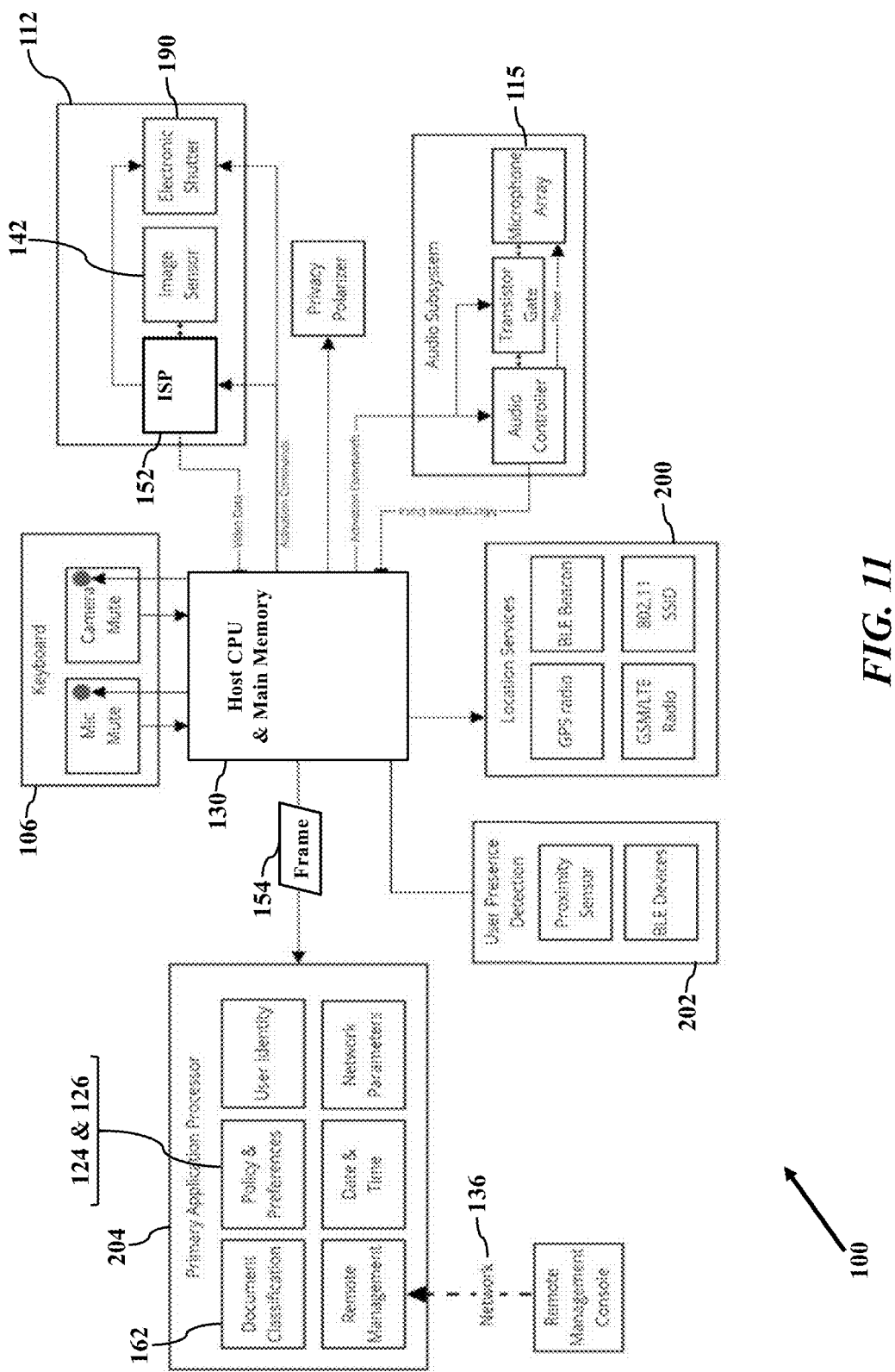
FIGS. 11-12 are block diagrams illustrating remote classification, according to exemplary embodiments.
Figure 12:
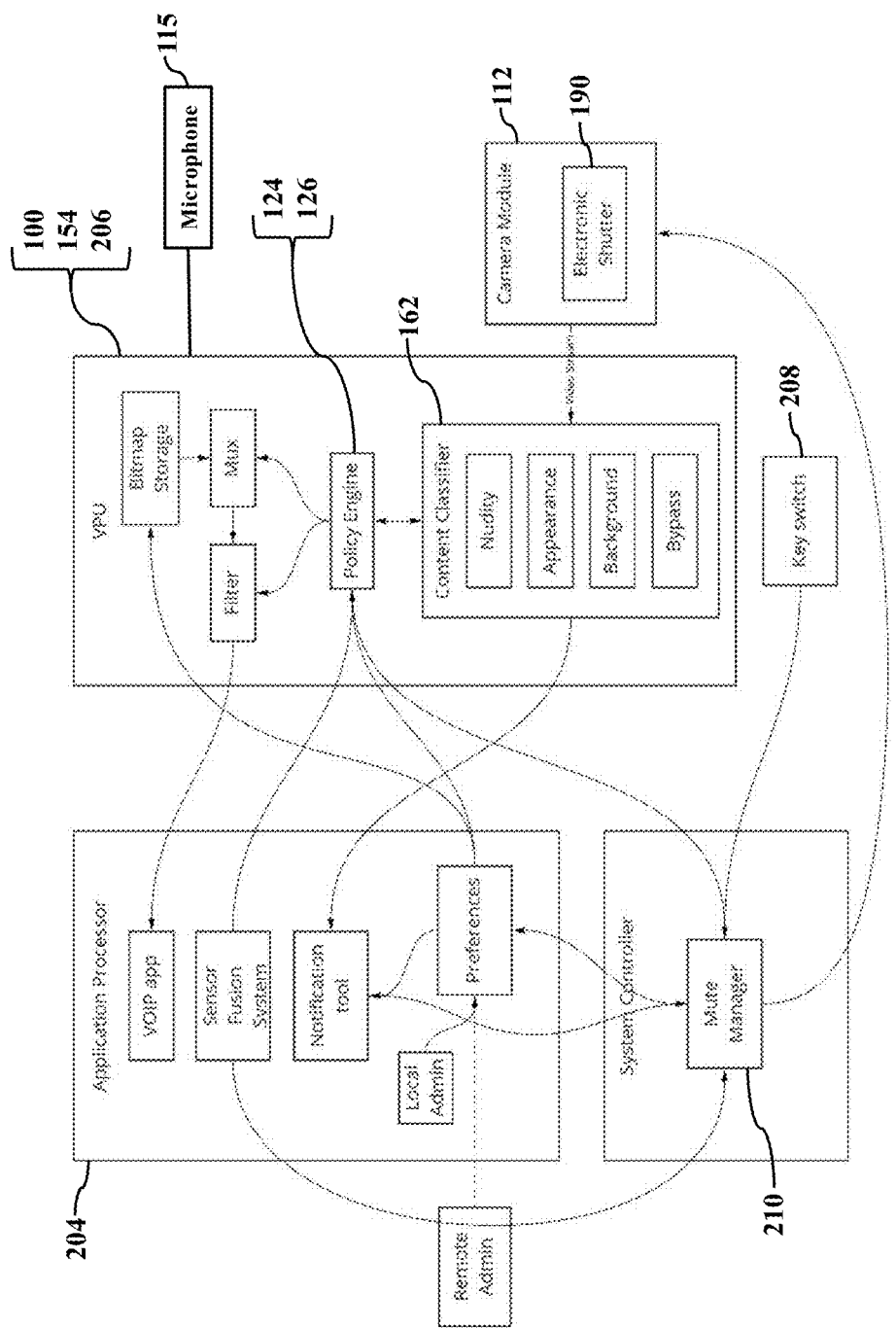

FIGS. 11-12 are block diagrams illustrating remote classification, according to exemplary embodiments. Here the information handling system 100 (such as the laptop computer 104 illustrated in FIG. 1) may offload or outsource classification to an application processor 204. The application processor 204 may be a peripheral card, USB drive, or other devices that interfaces with the information handling system 100 and the host central processing unit 130. The application processor 204 may additionally or alternatively be a baseboard management controller that interfaces with the information handling system 100 and the host central processing unit 130. The application processor 204 may additionally or alternatively be a remote server or cloud-based service that interfaces with the information handling system 100 and the host central processing unit 130 via the communications network 136. The application processor 204 may be remotely accessed, configured, and administratively controlled.

Exemplary embodiments may include remote classification. The host's central processing unit 130 interfaces with the web camera 112 and may generate the digital image frame 154. The host's central processing unit 130 may locally store the digital image frame 154 in the main memory and send/upload the frame to the network address, such as the Internet Protocol address, associated with or assigned to the application processor 204 and await instructions. When the application processor 204 receives the frame 154, the application processor 204 stores, accesses, and/or executes the classification algorithm 162 to remotely classify the frame 154 according to the logical rules 124 and/or the management policies 126.

The application processor 204 may then send commands or instructions to the information handling system 100 and/or the host central processing unit 130, based on the permissible/impermissible classification of the frame 154. For example, the application processor 204 may instruct the host's central processing unit 130 to approve or execute the quarantine release operation 164 that releases the frame 154 from the main memory. The application processor 204 may additionally or alternatively authorize the output operation 166 that permits the host's central processing unit 130 to output the digital image frame 154 to a network interface for upload into the Internet.

However, if the application processor 204 classifies the frame 154 as the impermissible image content 122, the application processor 204 may authorize or instruct the host's central processing unit 130 to execute the quarantine hold operation 170 that holds or confines the digital image frame 154 to or within the main memory. The application processor 204 may further authorize or instruct the host's central processing unit 130 to lock and prevent the digital image frame 154 from exiting the main memory. The host's central processing unit 130 may thus lack an ability, configuration, or permission to issue a read operation to the main memory to read/retrieve the frame 154.

Neither may the host's central processing unit 130 nor the main memory may send or address the frame 154 to the network interface. The offending frame 154 is locked within, and prevented from exiting, the host's main memory. Indeed the application processor 204 may further authorize or instruct the host's central processing unit 130 to issue a write operation to the main memory to overwrite the frame 154 with different or fresh data, such as a subsequent frame generated by the web camera 112. The offending frame 154 thus cannot be sent or uploaded to friends, coworkers, or the Internet.

Exemplary embodiments may also command the microphone 115. When the application processor 204 classifies the frame 154 as the impermissible image content 122 (based on the logical rules 124 and/or the management policies 126), the application processor 204 may send instructions for the host's central processing unit 130 to mute the microphone 115. The application processor 204 effectively deactivates or turns off the microphone 115 in response to image content classification. However, should the single frame 154 be classified as the permissible image content 128, the application processor 204 may send an on/unmute command to the host's central processing unit 130 and/or the microphone 115 to activate or resume operation and to generate audio output signals. The host's central processing unit 130 receives and processes the audio output signals to the network interface for upload into the Internet. The application processor 204 may thus remotely control the microphone 115 in response to frame-by-frame content.

The application processor 204 may further control the electromechanical shutter mechanism 190. The application processor 204 may send open and close commands to the host's central processing unit 130 and/or to the electromechanical shutter mechanism 190 operating in the web camera 112, in response to frame-by-frame content. Should the application processor 204 classify the frame 154 as the impermissible image content 122, the application processor 204 may command or instruct the host's central processing unit 130 to command the web camera 112 to close the micro/nano-mechanical louvers, shutters, or panels, thus preventing waves/photons from striking or passing to the image sensor 142. Should the single frame 154 be classified as the permissible image content 128, the application processor 204 may command the host's central processing unit 130 and/or the web camera 112 to open the micro/nano-mechanical louvers, shutters, or panels, thus allowing electromagnetic waves/photons to strike or pass to the image sensor 142. The application processor 204 may thus remotely control the web camera 112 to prevent a dissemination of sensitive image data.

The application processor 204 may additionally or alternatively include electrochromic control. Should the image sensor 142 incorporate the lens 140 having the electrochromic property 180, as explained above, the application processor 204 may command or instruct the host's central processing unit 130 to darken and lighten the lens 140, in response to frame-by-frame content. The application processor 204 sends a darken command to the host's central processing unit 130 and/or the web camera 112 in response to the impermissible image content 122, and the darken command causes the web camera 112 to darken the electrochromic lens 142 to reduce or even prevent electromagnetic waves/photons from passing through the lens 140 to the image sensor 142. However, should the frame 154 be classified as permissible, the application processor 204 may send a lighten command to increase the lens's light transmissibility 186. The application processor 204 may thus electrochromatically control the web camera 112 in response to frame-by-frame content.

The application processor 204 may also control other systems and features. The application processor 204, for example, may instruct the host's central processing unit 130 to activate or deactivate the locational services 200, in response to frame-by-frame content. The application processor 204 may also control the presence detection systems 202, based on frame-by-frame content classifications. The application processor 204 may also enable and disable any Bluetooth Low Energy (BLE) device, based on frame-by-frame content classifications.

As FIG. 12 illustrates, the application processor 204 may provide a voice-over Internet Protocol (VOIP) service. The web camera 115 may provide a stream of the frames 154 (perhaps via the communications network 136 illustrated in FIG. 1) to the information handing system 100. Here, though, the host's central processing unit 130 and main memory may be allocated/partitioned for video processing of the frames 154. The information handing system 100 thus has a video processing unit 206 that stores and executes the classification algorithm 162 using the logical rules 124 and/or the management policies 126. The application processor 204, the video processing unit 206, and perhaps even a manual/key switch 208 may interface with a mute manager 210. As the frame 154 is classified (as this disclosure explains), the application processor 204, the video processing unit 206, and the mute manager 210 may control the web camera 112 and/or the shutter mechanism 190 in response to frame-by-frame content. The mute manager 210 may also send mute commands to mute the microphone 115 in response to frame-by-frame content.

Figure 13:
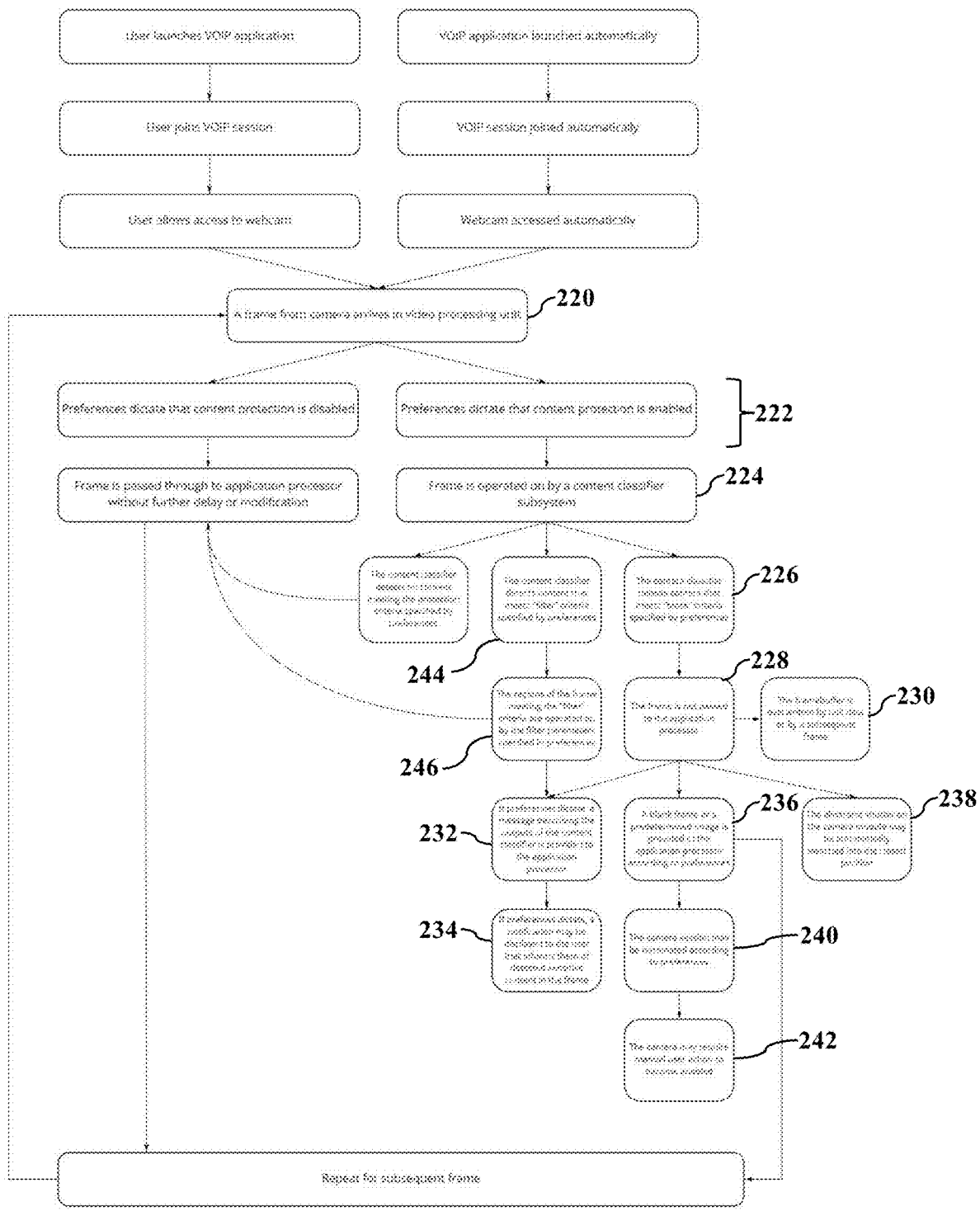
FIG. 13 is an operational flow diagram, according to exemplary embodiments.

FIG. 13 is an operational flow diagram, according to exemplary embodiments. When the voice-over Internet Protocol (VOIP) application or service launches or runs, here the web camera 115 may generate the frame 154 and send the frame 154 the video processing unit 206 (Block 220). When content classification is enabled (Blocks 222), the frame 154 is classified (Block 224). If the frame 154 is classified as impermissible (Block 226), the frame 154 is blocked from being sent to the application processor 204 (Block 228). Any memory device (such as a frame buffer) temporarily storing the frame 154 may be instructed to overwrite null data or to write/overwrite a subsequent frame (Block 230). A notification message may be sent to the application processor 204 that notifies of the blocked frame 154 (Block 232), and the application processor 204 may process or cause the notification to be displayed (Block 234). A blank frame, or a predetermine frame, may be sent to the application processor 204 (Block 236). The electromechanical shutter mechanism 190 may be commanded or instructed to close (Block 238). Because the frame 154 is classified as impermissible, the intelligent imaging device 102 and/or the web camera 112 may be instructed to cease operation, to cease sending video data or frames, and/or to cease any video session (Block 240). The user may be required to manually reactivate or re-enable the intelligent imaging device 102 and/or the web camera 112 (Block 242).

Exemplary embodiments may filter content. When the frame 154 is classified, some portion of the pixels/signals/content may contain or represent content identified for filtration (Block 244). That is, the logical rules 124 and/or the management policies 126 may define or specify that certain portions, objects, or subject matter be digitally removed and replaced with substitute or approved subject matter. Exemplary embodiments may thus perform a filtration operation that replaces objectionable or impermissible portions or regions within the frame 154 (Block 246). After the frame 154 is modified to generate a modified, permissible frame (Block 246), the modified/permissible frame may be reclassified (Block 224). A notification message may be sent to the application processor 204 that notifies of the filtration (Block 232), and the application processor 204 may process or cause the notification to be displayed (Block 234).

Figure 14:
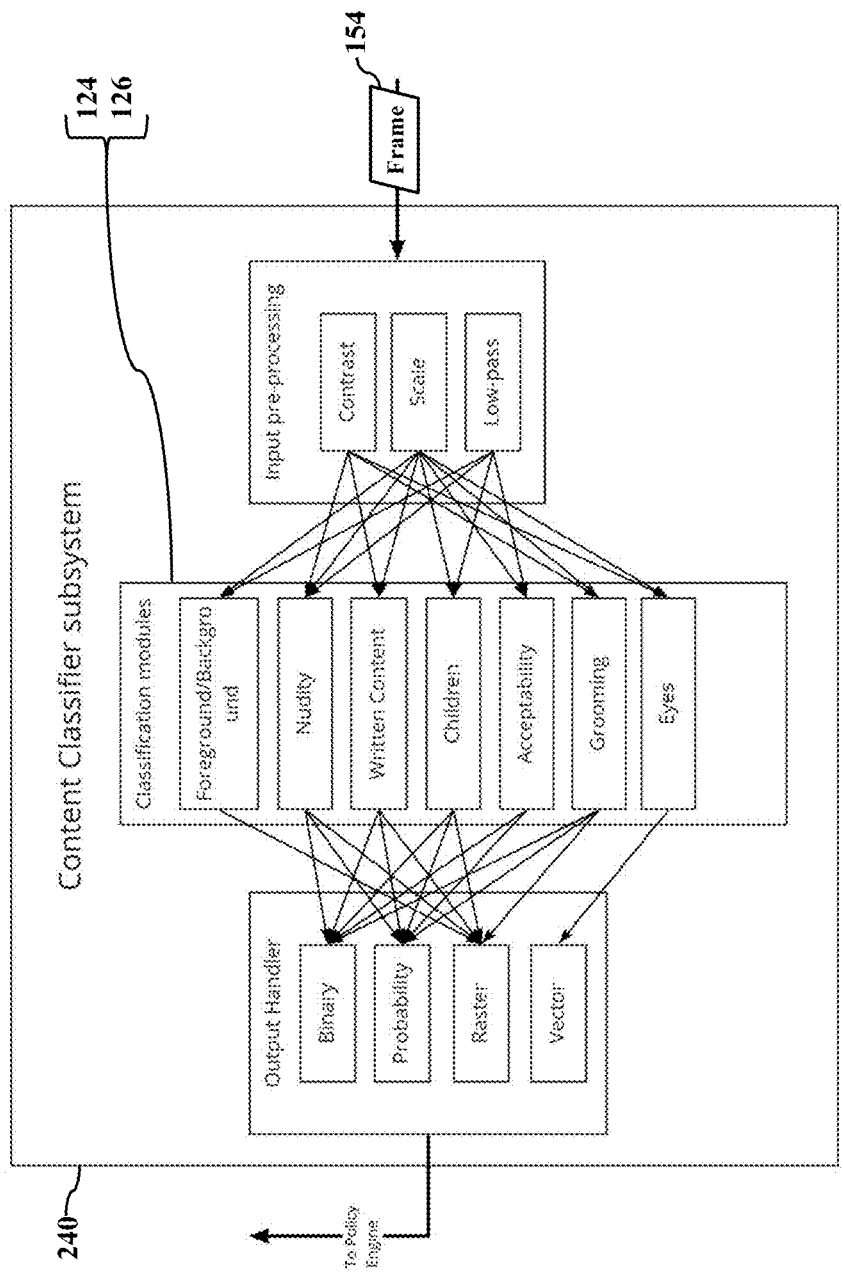
FIG. 14 further illustrates content classification, according to exemplary embodiments.

FIG. 14 further illustrates content classification, according to exemplary embodiments. The frame 154 is received by a content classifier subsystem 240. The content classifier subsystem 240 may pre-process the frame 154, prior to classifying the frame 154. The content classifier subsystem 240 may store, access, and/or retrieve the logical rules 124 and/or the management policies 126 defining or specifying permissible, impermissible, and/or filterable image content. The content classifier subsystem 240 may post-process the frame 154, after classification.

Exemplary embodiments may employ an image or video content classification system between the camera sensor and a device operating system. The primary goal of the classification step is to determine whether or not a given video frame meets criteria defined by user or system administrator preferences, such as the presence or absence of nudity or other objectionable or inappropriate visual content, as determined by the user or administrator and/or the presence or absence of restricted content in the foreground or background of the field of view, such as a young child, whiteboard, or any other class of content deemed restricted by the user or administrator.

The content classification subsystem operates on the pixel information contained in captured image frames, using convolutional analysis techniques commonly employed in the art. The content classification system may consist of an input processing module, a series of classification models, and an output handler for each classification model, which can be either binary, numerical, or raster output, or a combination thereof. The content classification subsystem or any of its subcomponents may operate on the full input resolution of captured images from the camera, or may downscale input images to reduced resolution in order to require fewer processing cycles to complete the classification tasks, reducing any latency added by the classification process and to reduce system power consumption. It is preferable for the content classification subsystem to complete its operation on a given frame in a fixed time interval, so that latency added to the signal path can be kept stable and as low as possible. It is preferable the classification modules operate at the minimum numerical precision necessary to accurately perform against the classification criteria, to reduce latency, memory requirements, and processing time.

As FIG. 14 illustrates, the content classification system may by example contain classification modules. Foreground/background segmentation, where the output is a raster mapping of foreground and background pixels. Full or partial nudity, where the output is a numerical value indicating the probability that an image contains nudity, and may also provide a raster mapping of image regions with nudity probabilities for each image region. Personal grooming, where the output is a numerical value indicating the probability that the subject of an image has a well kept personal appearance. Children, where the output is a raster mapping of image regions with probabilities that each region contains children. Written content, where the output is a raster mapping of image regions where written content may be visible. Acceptability, where the output is a numerical probability that the image overall meets general standards of professionalism. Eyes, where the output is a vector depicting the size, position, and pose of the primary speaker's eyes. Authorization, where the output is a probability that the person depicted in the image is authorized to utilize the computing device.

Exemplary embodiments may further employ an actively managed frame buffer with any memory device. On a determined cadence, the system may elect to provide the contents of the frame buffer to the operating system media framework, automatically filter the contents of the frame buffer according to the output of the classifier, overwrite the frame buffer with other content, or discard the contents of the frame buffer according to the output of the classifier, in accordance with the preferences determined by the user or system administrator.

The system may also consume the output of the classifier to perform additional actions. The classifier output, upon meeting certain criteria determined by user or administrator preferences, may be provided to an application within the local device operating system, which may log the occurrence of the detection event, provide a user notification, or communicate with a remote service via a communications network. The classifier output, upon meeting certain criteria determined by user or administrator preferences, may be provided to a management subsystem separate from the device operating system, such as in the BIOS or other device firmware. The management subsystem may assert functions such as muting of multiple connected audio/video in response to the detection of the criteria by the classifier. The management system may also actuate an electronically controllable lens covering device affixed onto the camera module, so as to obscure the lens from view and block its functional operation when certain criteria have been detected.

The system may also self-govern based on the classifier output. For a given set of classification criteria, the system may downgrade the camera hardware module into an inactive state, and reset its own operating state to an initial state.

Prior to entering an inactive state, the camera system may process additional subsequent frames through the content classifier in order to reinforce the classification confidence. During this reinforcement period, image frames may or may not be provided to the operating system media framework. Whether or not frames are provided to the operating system during the reinforcement period, as well as the time interval of the reinforcement period or the number of frames to be collected, may be determinable by the user or their administrator by adjusting settings in a software application running within the host operating system.

For a given set of classification criteria, the system may downgrade the camera hardware module into an inactive state, and a specific user action may be required to return the camera device to an active state, such as interaction with an on-screen interface element, or physical actuation of a button or switch to ensure positive authorization of the operating condition by the user.

The system may automatically implement filtering or generative modifications to the image frame sequence, sufficient to alter the image frame sequence to comply with of or more criteria in the classification system or determined by user or administrator preferences. Generative filtering is the addition and composition of novel content or elements within the image frame. In one example, a generative filter creates an alternative hairstyle and replaces the pixel values in the frame, sufficient to change the visual appearance of the individual in the frame with high fidelity. A modified image frame may be reprocessed through one or more classification modules to ensure that the modifications have sufficiently remedied the impermissible content regions, prior to releasing the modified frames from quarantine.

In another example, a user may semantically define criteria they wish to see generated to replace the background scenery in the camera's visual field, such as entering text describing the desired content in one example: "mountains with trees and a stream." The generative filtering system will first parse the text input to form a semantic content model on which to bias the generator's weights. The generator will then produce a novel image matching the semantic criteria parsed from the text input, utilizing a text-to-image generative system as demonstrated in the art. The image will be stored in a memory buffer and composited into the captured image frames from the camera based on a segmentation algorithm operating within the image content classifier.

To perform effectively against the classification criteria, the classifier must be trained to recognize types of specific visual content. In a machine learning model, the classification system is provided with many examples of content labeled with the desired content criteria. Through the pixel-level analysis of a large number of labeled images, the system may self-optimize its weights and biases to reliably detect the criteria in arbitrary images. This machine-learned approach can be negative or positive in its detection technique. Specific criteria may be positively identified (such as nudity, inappropriate clothing, or unkempt appearance). Nonconforming scenarios may be negatively identified, meaning if the scenario is not positively classified as unrestricted, it may by default be deemed restricted. For example, the system may be provided many examples of both restricted an unrestricted images. During use, an image may not be positively classified as restricted, but may also not be positively classified as unrestricted. In accordance with user and administrator policies, an image not positively classified as unrestricted may be automatically considered restricted, and remediations applied as explained herein.

Exemplary embodiments may include a self-governing camera system which adjusts its own operating state based on detection of visual content in the field of view. Exemplary embodiments may include a camera system which self-governs based on content classified as sensitive or objectionable. Exemplary embodiments allow a user or administrator to define the parameters under which their camera device will self-govern its operating state. Exemplary embodiments may include a camera system which can automatically enforce the actuation of a physical lens covering device in response to content detected within its field of view. Exemplary embodiments are capable of enforcing the receipt of a specific user action to remain in an active state based on the detection of certain content within its field of view.

Exemplary embodiments provide many advantages. Exemplary embodiments mitigate the risk that a user will wittingly or unwittingly broadcast objectionable content to their colleagues or clients. Exemplary embodiments mitigate the risk that a user may unwittingly broadcast inappropriate or objectionable images of their family members or cohabitants to their colleagues or clients. Exemplary embodiments mitigate the risk that sensitive information in a user's background may be displayed to unauthorized viewers. Exemplary embodiments reduce the liability of companies who may be at risk of harassment claims and damages if employees are subjected to inappropriate or objectionable content. Exemplary embodiments ensure that user authorization is provided to reinitialize the camera if it shuts down for a restricted content reason. Exemplary embodiments mitigate the risk of video chat sessions starting without user authorization. Exemplary embodiments help users present a consistent and professional appearance to their colleagues and clients.

Exemplary embodiments may be adapted/applied to all personal electronics devices which contain an embedded camera device, and most particularly to personal computers and personal communications devices where the camera is embedded or peripheral to the device. Exemplary embodiments automatically provide and implement a privacy mode of operation. Exemplary embodiments provide a device/usage experience employing a combined set of software and hardware capabilities to deliver best-in-class user privacy control. Exemplary embodiments provide predictive device privacy and anticipate the needs of users. Exemplary embodiments proactively optimize device settings and managing application focus.

Exemplary embodiments may utilize any bus technology, standard, or interface. The bus 158 may be any input/output channel or scheme. For example, the bus 158 may include one or more point-to-point PCIe links, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof.

Exemplary embodiments may utilize any memory technology, standard, or interface. The memory devices may include non-volatile RAM (NV-RAM), hard disk drive, optical disk drive, and/or solid-state drive. The memory devices may have a memory interface to a processor or chipset. An example of memory interface includes a Double Data Rate (DDR) memory channel, and memory represents one or more DDR Dual In-Line Memory Modules (DIMMs). In a particular embodiment, memory interface represents two or more DDR channels. In another embodiment, one or more of processors include memory interface that provides a dedicated memory for the processors. A DDR channel and the connected DDR DIMMs can be in accordance with a particular DDR standard, such as a DDR3 standard, a DDR4 standard, a DDR5 standard, or the like. Memory may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Exemplary embodiments may utilize any graphics/video/image technology, standard, or interface. Exemplary embodiments may utilize a peripheral component interconnect-express interface (PCIe) and graphics adapter, as needed or desired. In a particular embodiment, graphics adapter is provided on a system printed circuit board (PCB). Video display output can include a digital video interface (DVI), a high definition multimedia interface (HDMI), DisplayPort interface, or the like. Video display can include a monitor, a smart television, an embedded display such as a laptop computer display, or the like.

Exemplary embodiments may utilize any peripheral technology, standard, or interface. Disk controller includes a disk interface that connects the disc controller to hard disk drive, to optical disk drive, and to disk emulator. Disk interface may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator permits a solid-state drive (SSD) to be connected to information handling system 100 via an external interface. An example of external interface includes a USB interface, an IEEE 1394 (Firewire) interface, a proprietary interface, or a combination thereof. Alternatively, SSD can be disposed within information handling system 100.

Exemplary embodiments may utilize any networking technology, standard, or interface. The network interface device represents a network communication device disposed within information handling system 100, on a main circuit board of the information handling system, integrated onto another element such as chipset, in another suitable location, or a combination thereof. Network interface device includes a network channel that provides an interface to devices that are external to information handling system 100. In a particular embodiment, network channel is of a different type than peripheral channel and network interface device translates information from a format suitable to the peripheral channel to a format suitable to external devices. In a particular embodiment, network interface device includes a host bus adapter (HBA), a host channel adapter, a network interface card (NIC), or other hardware circuit that can connect the information handling system to a network. An example of network channel includes an InfiniBand channel, a fiber channel, a gigabit Ethernet channel, a proprietary channel architecture, or a combination thereof. Network channel can be connected to an external network resource (not illustrated). The network resource can include another information handling system, a data storage system, another network, a grid management system, another suitable resource, or a combination thereof.

Exemplary embodiments may include the baseboard management controller. The BMC is connected to multiple elements of information handling system 100 via one or more management interface to provide out of band monitoring, maintenance, and control of the elements of the information handling system. As such, BMC represents a processing device different from processors, which provides various management functions for information handling system 100. In an embodiment, BMC may be responsible for granting access to a remote management system that may establish control of the elements to implement power management, cooling management, storage management, and the like. The BMC may also grant access to an external device. In this case, the BMC may include transceiver circuitry to establish wireless communications with the external device such as a mobile device. The transceiver circuitry may operate on a Wi-Fi channel, a near-field communication (NFC) channel, a Bluetooth or Bluetooth-Low-Energy (BLE) channel, a cellular based interface such as a global system for mobile (GSM) interface, a code-division multiple access (CDMA) interface, a universal mobile telecommunications system (UMTS) interface, a long-term evolution (LTE) interface, another cellular based interface, or a combination thereof. A mobile device may include Ultrabook, a tablet computer, a netbook, a notebook computer, a laptop computer, mobile telephone, a cellular telephone, a smartphone, a personal digital assistant, a multimedia playback device, a digital music player, a digital video player, a navigational device, a digital camera, and the like.

The term BMC may be used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller, and embedded controllers included at the blades of the blade server can be referred to as blade management controllers. Out-of-band communication interfaces between BMC and elements of the information handling system may be provided by management interface 192 that may include an inter-integrated circuit (I2C) bus, a system management bus (SMBUS), a power management bus (PMBUS), a low pin count (LPC) interface, a serial bus such as a universal serial bus (USB) or a serial peripheral interface (SPI), a network interface such as an Ethernet interface, a high-speed serial data link such as PCIe interface, a network controller-sideband interface (NC-SI), or the like. As used herein, out-of-band access refers to operations performed apart from a BIOS/operating system execution environment on information handling system 100, that is apart from the execution of code by processors and procedures that are implemented on the information handling system in response to the executed code.

In an embodiment, the BMC implements an integrated remote access controller (iDRAC) that operates to monitor and maintain system firmware, such as code stored in BIOS/EFI module, option ROMs for graphics interface, disk controller, add-on resource, network interface, or other elements of information handling system 100, as needed or desired. In particular, BMC includes a network interface that can be connected to a remote management system to receive firmware updates, as needed or desired. Here BMC receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC utilizes various protocols and application programming interfaces (APIs) to direct and control the processes for monitoring and maintaining the system firmware. An example of a protocol or API for monitoring and maintaining the system firmware includes a graphical user interface (GUI) associated with BMC, an interface defined by the Distributed Management Taskforce (DMTF) (such as Web Services Management (WS-MAN) interface, a Management Component Transport Protocol (MCTP) or, Redfish interface), various vendor defined interfaces (such as Dell EMC Remote Access Controller Administrator (RACADM) utility, Dell EMC Open Manage Server Administrator (OMSS) utility, Dell EMC Open Manage Storage Services (OMSS) utility, Dell EMC Open Manage Deployment Toolkit (DTK) suite), representational state transfer (REST) web API, a BIOS setup utility such as invoked by a "F2" boot option, or another protocol or API, as needed or desired.

In a particular embodiment, BMC is included on a main circuit board (such as a baseboard, a motherboard, or any combination thereof) of information handling system 100, or is integrated into another element of the information handling system such as chipset, or another suitable element, as needed or desired. As such, BMC can be part of an integrated circuit or a chip set within information handling system 100. BMC may operate on a separate power plane from other resources in information handling system 100. Thus BMC can communicate with the remote management system via network interface or the BMC can communicate with the external mobile device using its own transceiver circuitry while the resources or elements of information handling system 100 are powered off or at least in low power mode. Here, information can be sent from the remote management system or external mobile device to BMC and the information can be stored in a RAM or NV-RAM associated with the BMC. Information stored in the RAM may be lost after power-down of the power plane for BMC, while information stored in the NV-RAM may be saved through a power-down/power-up cycle of the power plane for the BMC.

In a typical usage case, information handling system 100 represents an enterprise class processing system, such as may be found in a datacenter or other compute-intense processing environment. Here, there may be hundreds or thousands of other enterprise class processing systems in the datacenter. In such an environment, the information handling system may represent one of a wide variety of different types of equipment that perform the main processing tasks of the datacenter, such as modular blade servers, switching and routing equipment (network routers, top-of-rack switches, and the like), data storage equipment (storage servers, network attached storage, storage area networks, and the like), or other computing equipment that the datacenter uses to perform the processing tasks.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of pixelated classification of a digital image frame, comprising:
   capturing, by a camera of an information handling system, the digital image frame;
   quarantining, by the information handling system, the digital image frame in a frame buffer memory;
   comparing, by the information handling system, pixels representing the digital image frame to logical rules specifying permissible image content;
   in response to the pixels representing the digital image frame satisfying the logical rules specifying the permissible image content, releasing the digital image frame from the quarantining in the frame buffer memory;
   in response to the pixels representing the digital image frame failing to satisfy the logical rules specifying the permissible image content, classifying the digital image frame as impermissible image content; and
   in response to classifying the digital image frame as impermissible image content, overwriting a portion of the digital image frame quarantined in the frame buffer memory that includes offending content with non-offending content, and changing a light transmissibility of a lens of the camera.

2. The method of claim 1, wherein in response to the classifying of the digital image frame as the impermissible image content, further comprising closing a shutter mechanism associated with the camera.

3. The method of claim 1, wherein in response to the classifying of the digital image frame as the impermissible image content, further comprising preventing the camera from generating a subsequent digital image frame by closing a shutter mechanism.

4. The method of claim 1, wherein in response to the classifying of the digital image frame as the impermissible image content, further comprising sending a shutter close command instructing the camera to close a shutter.

5. The method of claim 1, wherein in response to the classifying of the digital image frame as the impermissible image content, further comprising muting a microphone.

6. The method of claim 1, wherein in response to the classifying of the digital image frame as the impermissible image content, further comprising sending a microphone mute command instructing a microphone to mute an audio output.

7. The method of claim 1, wherein in response to the pixels representing the digital image frame satisfying the logical rules specifying the permissible image content, further comprising sending a shutter open command instructing the camera to open a shutter.

8. The method of claim 1, wherein in response to the pixels representing the digital image frame satisfying the logical rules specifying the permissible image content, further comprising activating a microphone.

9. The method of claim 1, wherein in response to the pixels representing the digital image frame satisfying the logical rules specifying the permissible image content, further comprising classifying the digital image frame as permissible image content.

10. A system, comprising:
    a camera;
    a processor; and
    a memory device storing instructions that when executed by processor perform operations including:
       photoelectrically generating, by the camera, a single digital image frame;
       quarantining only the single digital image frame in a frame buffer memory;
       while only the single digital image frame is quarantined in the frame buffer memory:
       comparing pixels representing the single digital image frame to logical rules specifying a permissible image content;
       in response to the pixels representing the single digital image frame satisfying the logical rules specifying the permissible image content, releasing the single digital image frame from the quarantining in the frame buffer memory; and
       after the releasing of the single digital image frame from the quarantining in the frame buffer memory, photoelectrically generating a subsequent single digital image frame and overwriting the single digital image frame in the frame buffer memory with the another single digital image frame;
       in response to the pixels representing the single digital image frame failing to satisfy the logical rules specifying the permissible image content, classifying the single digital image frame as impermissible image content;
       photoelectrically generating the subsequent single digital image frame; and in response to classifying the digital image frame as impermissible image content, overwriting a portion of the single digital image frame quarantined in the frame buffer memory that includes offending content with non-offending content, and changing a light transmissibility of a lens of the camera.

11. The system of claim 10, wherein the operations further include closing a shutter mechanism associated with the camera.

12. The system of claim 10, wherein the operations further include sending a shutter close command instructing the camera to close a shutter.

13. The system of claim 10, wherein the operations further include muting a microphone.

14. The system of claim 10, wherein the operations further include sending a microphone mute command instructing a microphone to mute an audio output.

15. The system of claim 10, wherein the operations further include sending a shutter open command instructing the camera to open a shutter.

16. The system of claim 10, wherein the operations further include activating a microphone.

17. The system of claim 10, wherein the operations further include classifying the digital image frame as permissible image content.

18. A memory device storing instructions that when executed by perform operations, the operations comprising:
   capturing, by a camera of an information handling system, the digital image frame;
   photoelectrically generating, by the camera, a first digital image frame;
   quarantining only the first digital image frame in a frame buffer memory;
   while only the first digital image frame is quarantined in the frame buffer memory:
      comparing pixels representing the first digital image frame to logical rules specifying a permissible image content;
      if the pixels representing the first digital image frame satisfy the logical rules specifying the permissible image content, then releasing the first digital image frame from the quarantining in the frame buffer memory; and
      after the releasing of the first digital image frame from the quarantining in the frame buffer memory, photoelectrically generating a subsequent second single digital image frame and overwriting the first digital image frame in the frame buffer memory with the second digital image frame;
      if the pixels representing the first digital image frame fail to satisfy the logical rules specifying the permissible image content, then classifying the first digital image frame as impermissible image content;
   photoelectrically generating the subsequent second digital image frame; and
   in response to classifying the digital image frame as impermissible image content, overwriting a portion of the first digital image frame quarantined in the frame buffer memory that includes offending content with non-offending content, and changing a light transmissibility of a lens of the camera.

19. The memory device of claim 18, wherein the operations further include closing a shutter mechanism associated with the camera.

20. The memory device of claim 18, wherein the operations further include muting a microphone.

* * * * *